(12) United States Patent
Kim et al.

(10) Patent No.: US 10,852,594 B2
(45) Date of Patent: Dec. 1, 2020

(54) LIQUID CRYSTAL DISPLAY

(71) Applicant: Samsung Display Co., Ltd., Yongin-si (KR)

(72) Inventors: Yeon Cu Kim, Yongin-si (KR); Israel Esteban Lazo Martinez, Hwaseong-si (KR); Ki Chui Shin, Seongnam-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 16/566,539

(22) Filed: Sep. 10, 2019

(65) Prior Publication Data

US 2020/0081302 A1    Mar. 12, 2020

(30) Foreign Application Priority Data

Sep. 11, 2018  (KR) .......................... 10-2018-0108355

(51) Int. Cl.
| | | |
|---|---|---|
| *G02F 1/1343* | (2006.01) | |
| *G02F 1/1337* | (2006.01) | |
| *G02F 1/163* | (2006.01) | |
| *G02F 1/1335* | (2006.01) | |

(52) U.S. Cl.
CPC .. *G02F 1/134309* (2013.01); *G02F 1/133528* (2013.01); *G02F 1/133707* (2013.01); *G02F 1/163* (2013.01); *G02F 2001/1635* (2013.01)

(58) Field of Classification Search
CPC .............................................. G02F 1/134309
See application file for complete search history.

(56) References Cited

U.S. PATENT DOCUMENTS

| | | | |
|---|---|---|---|
| 8,502,943 B2 | 8/2013 | Fan et al. | |
| 2010/0053488 A1* | 3/2010 | Kim .................. | G02F 1/136213 349/48 |
| 2012/0026206 A1* | 2/2012 | Moon .................. | G09G 3/3614 345/690 |
| 2012/0244471 A1* | 9/2012 | Kim ...................... | G03F 7/0226 430/281.1 |

(Continued)

FOREIGN PATENT DOCUMENTS

| | | |
|---|---|---|
| KR | 1020080002242 | 1/2008 |
| KR | 1020160145912 | 12/2016 |

(Continued)

*Primary Examiner* — Edmund C Lau
(74) *Attorney, Agent, or Firm* — Cantor Colburn LLP

(57) ABSTRACT

A liquid crystal display includes: a liquid crystal panel including a liquid crystal layer, a pixel electrode, and a common electrode; and a backlight unit including a light source to provide light to the liquid crystal panel. The pixel electrode includes a longitudinal electrode having a bar shape and extending in a vertical direction; a transverse electrode having a bar shape, crossing the longitudinal electrode, and extending in a horizontal direction; and a branch electrode having a bar shape, extending from the longitudinal or transverse electrode, and including an oblique part extending in an oblique direction. The common electrode overlaps the longitudinal electrode, and a longitudinal opening extending in the vertical direction is defined in the common electrode, and a width of a part of the pixel electrode where the longitudinal and the transverse electrodes cross each other is substantially the same as a width of the transverse electrode.

20 Claims, 21 Drawing Sheets

(56) References Cited

U.S. PATENT DOCUMENTS

| | | | | |
|---|---|---|---|---|
| 2017/0038655 A1* | 2/2017 | Cheng | .................. | G02F 1/1343 |
| 2017/0115446 A1* | 4/2017 | Hirayama | ............ | G02B 6/0056 |
| 2017/0176822 A1* | 6/2017 | Yoon | ................ | G02F 1/134309 |
| 2019/0041705 A1* | 2/2019 | Hao | .................... | G02F 1/13439 |

FOREIGN PATENT DOCUMENTS

| | | |
|---|---|---|
| KR | 1020170000898 | 1/2017 |
| KR | 1020170023261 | 3/2017 |
| KR | 1020170116271 | 10/2017 |

\* cited by examiner

FIG. 16
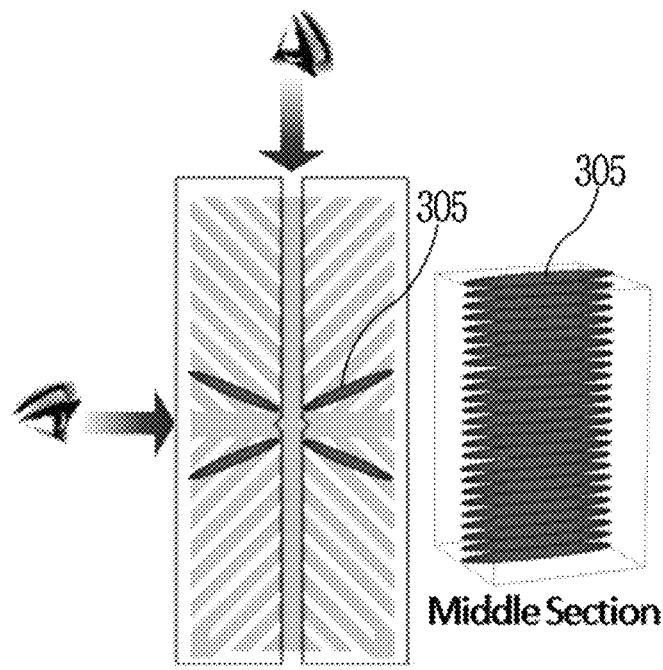
Middle Section
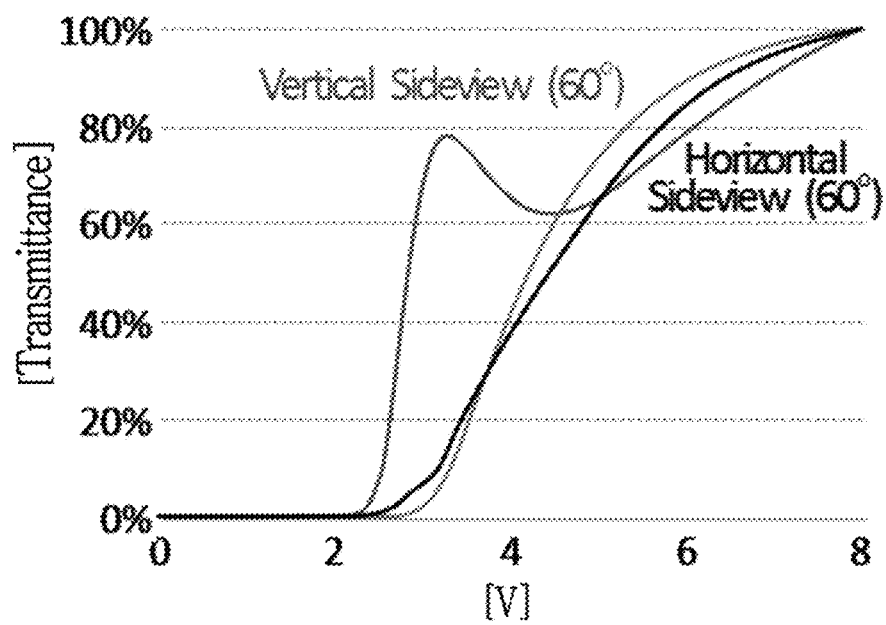

LIQUID CRYSTAL DISPLAY

This application claims priority to Korean Patent Application No. 10-2018-0108355, filed on Sep. 11, 2018, and all the benefits accruing therefrom under 35 U.S.C. § 119, the content of which in its entirety is herein incorporated by reference.

BACKGROUND

(a) Field

The disclosure relates to a liquid crystal display, and in detail, relates to a high-resolution liquid crystal display having high transmittance.

(b) Description of the Related Art

A liquid crystal display may include two field generating electrodes, a liquid crystal layer, a color filter, and a polarization layer. Light generated from a light source reaches a viewer after passing through the liquid crystal layer, the color filter and the polarization layer, and a polarization characteristic of light is changed depending on an arrangement angle of the liquid crystal layer, and as a result, a grayscale of an image displayed by the light from the light source is controlled while light is partially blocked by the polarization layer.

SUMMARY

When the resolution of a display device becomes higher, a size of the pixel becomes smaller such that the transmittance decreases when the display device is displayed in a conventional method.

Exemplary embodiments are directed to a liquid crystal display having high transmittance.

An exemplary embodiment of a liquid crystal display includes: a liquid crystal panel including a liquid crystal layer, a pixel electrode, and a common electrode; and a backlight unit including a light source, where the backlight unit provides light to the liquid crystal panel. In such an embodiment, the pixel electrode includes: a longitudinal electrode having a bar shape and extending in a vertical direction; a transverse electrode having a bar shape, crossing the longitudinal electrode, and extending in a horizontal direction; and a branch electrode having a bar shape, extending from the longitudinal electrode and the transverse electrode, and including an oblique part extending in an oblique direction with respect to the longitudinal electrode or the transverse electrode. In such an embodiment, the common electrode has a longitudinal opening overlaping the longitudinal electrode of the pixel electrode, and extending in the vertical direction, and a width of a part of the pixel electrode where the longitudinal electrode and the transverse electrode cross each other is substantially the same as a width of the transverse electrode or a width of the longitudinal electrode.

In an exemplary embodiment, the pixel electrode may further include an edge transverse electrode having a bar shape, extending in the horizontal direction, and connected to an end of the longitudinal electrode.

In an exemplary embodiment, the edge transverse electrode may be connected to an end of the branch electrode.

In an exemplary embodiment, the oblique part of the branch electrode may form an angle in a range of about 60 degrees to about 80 degrees with the transverse electrode.

In an exemplary embodiment, the common electrode may further includes a notch opening having a width extended at the longitudinal opening.

In an exemplary embodiment, the notch opening may overlap the part where the longitudinal electrode and the transverse electrode cross each other.

In an exemplary embodiment, the pixel electrode may further include an edge longitudinal electrode having a bar shape, connected to an end of the transverse electrode, and parallel to the longitudinal electrode.

In an exemplary embodiment, the pixel electrode may further include an edge longitudinal electrode having a bar shape and parallel to the longitudinal electrode, and the edge longitudinal electrode may be connected to an end of the branch electrode and may not be connected to the transverse electrode.

In an exemplary embodiment, the branch electrode may further include a part parallel to the transverse electrode or the longitudinal electrode, thereby defining a bent structure with the oblique part.

In an exemplary embodiment, the common electrode may further includes a notch opening having a width extended at the longitudinal opening, and the notch opening may overlap the part where the longitudinal electrode and the transverse electrode cross each other.

In an exemplary embodiment, the notch opening may extend to be parallel to the transverse electrode.

In an exemplary embodiment, the pixel electrode may include a first pixel electrode and a second pixel electrode adjacent to each other, the liquid crystal panel may further include a first gate line, a second gate line, a first data line, a second data line, a first thin film transistor, and a second thin film transistor, the first thin film transistor may be connected to the first pixel electrode and connected to the first gate line and the first data line, and the second thin film transistor may be connected to the second pixel electrode and connected to the second gate line and the second data line.

In an exemplary embodiment, the first gate line and the second gate line may receive a same gate signal as each other.

In an exemplary embodiment, the first pixel electrode and the second pixel electrode may be arranged along an extending direction of the first data line and the second data line, and the first data line and the second data line may be disposed to cross the first pixel electrode and the second pixel electrode, respectively.

In an exemplary embodiment, the liquid crystal panel may further include an upper polarizer and a lower polarizer attached at both sides thereof, respectively.

In an exemplary embodiment, the backlight unit may further include a prism sheet disposed under the liquid crystal panel and a reflection sheet disposed under the prism sheet, the prism sheet may have a prism hill, and the prism hill may be disposed toward the reflection sheet.

In an exemplary embodiment, an extending direction of the prism hill may be the same as a short side direction of the liquid crystal panel, and a prism hill extending in a long side direction of the liquid crystal panel may not be included.

In an exemplary embodiment, the backlight unit may further include a light guide between the prism sheet and the reflection sheet, and the light source may be disposed at a side of the light guide.

In an exemplary embodiment, the liquid crystal panel may further include a diffuser attached to an upper surface of the upper polarizer.

In an exemplary embodiment, the diffuser may diffuse the light incident thereto to the short side direction of the liquid crystal panel.

According to exemplary embodiments, even if a size of the pixel decreases as the liquid crystal display having high resolution, the arrangement direction of the liquid crystal molecules is arranged to have high transmittance, thereby obtains high transmittance. In such embodiments, the characteristic deterioration from a side view due to the arrangement characteristic of the liquid crystal molecules is effectively compensated by using the reversely-arranged prism sheet that transmits the light in the left and right side directions.

In such embodiments, a writing time of the data voltage is effectively secured in a case of high resolution. In such embodiments, two data lines may be disposed for one pixel column, such that the pixels of two rows may be turned on with the same timing. In such embodiments, two data lines may be disposed to cross the pixel, such that a region covered by a black matrix is reduced, thereby improving transmittance.

BRIEF DESCRIPTION OF THE DRAWINGS

The above and other features of the invention will become more apparent by describing in further detail exemplary embodiments thereof with reference to the accompanying drawings, in which:

FIG. 16 is a view showing light leakage in an upper side for an arrangement of liquid crystal molecules according to an exemplary embodiment;

DETAILED DESCRIPTION

Figure 1:
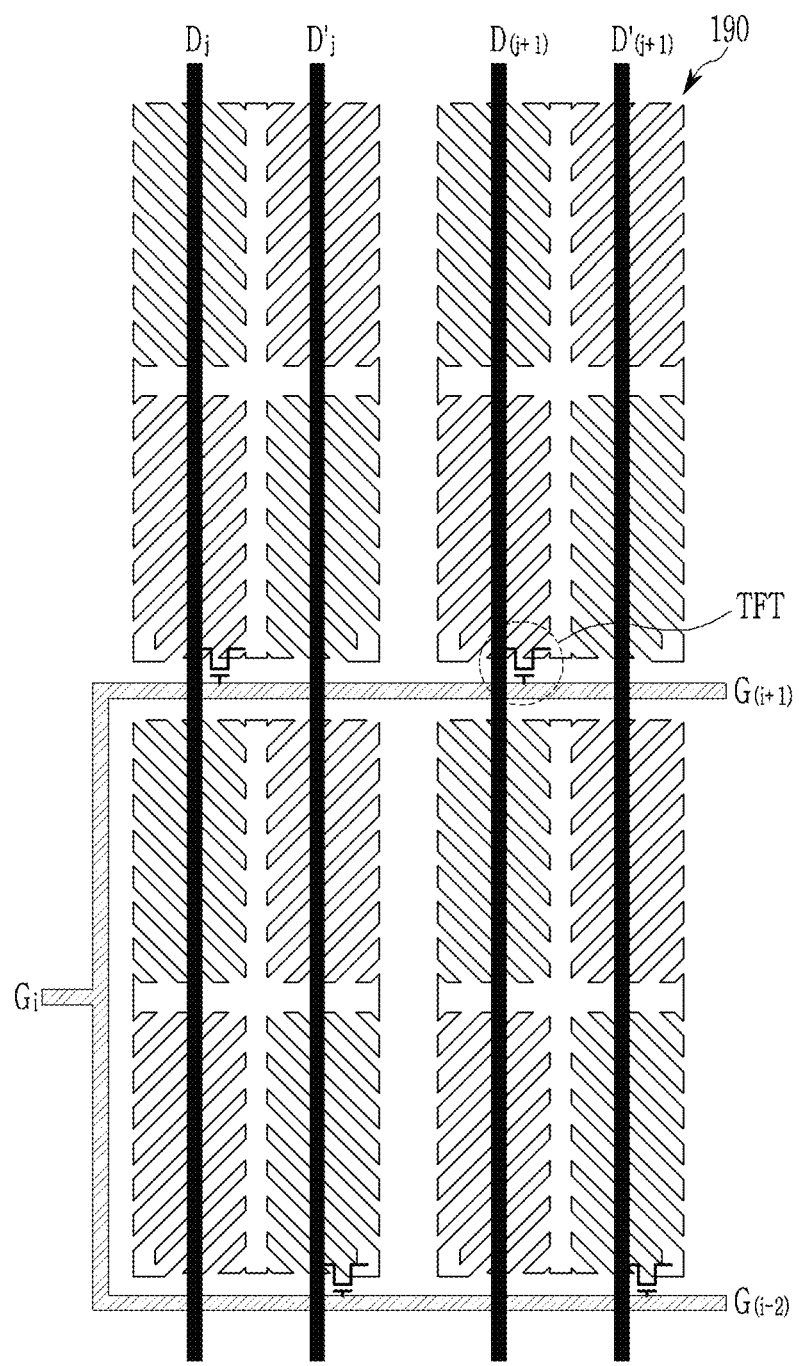
FIG. 1 is a schematic view showing a connection relationship of a pixel electrode in a liquid crystal display according to an exemplary embodiment.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Further, in the drawings, a size and thickness of each element are arbitrarily represented for better understanding and ease of description, and the invention is not limited thereto. In the drawings, the thickness of layers, films, panels, regions, etc., are exaggerated for clarity. In the drawings, the thickness of layers, films, panels, regions, etc., are exaggerated for the convenience of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "at least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The phrase "on a plane" means viewing the object portion from the top, and the phrase "on a cross-section" means viewing a cross-section of which the object portion is vertically cut from the side.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a schematic view showing a connection relationship of a pixel electrode in a liquid crystal display according to an exemplary embodiment.

A relationship of a pixel electrode 190, gate lines Gi, G(i-1), and G(i-2), data lines Dj, D'j, D(j+1), and D'(j+1), and a thin film transistor TFT in a lower panel of the liquid crystal display according to an exemplary embodiment will be described in detail with reference to FIG. 1.

In an exemplary embodiment, the lower panel of the liquid crystal display has a structure in which one gate line Gi is divided into two gate lines G(i-1) and G(i-2) to be connected to pixel electrodes 190 of two rows. In such an embodiment, two data lines (a pair of data lines) are disposed in a column of pixel electrodes 190. In an exemplary embodiment, as shown in FIG. 1, two data lines Dj and D'j are disposed to vertically extend and cross a pixel electrode 190 of the pixel electrodes 190 of a first column, e.g., a left column, and other two data lines D(j+1) and D'(j+1) are disposed to vertically extend and cross a pixel electrode 190 of the pixel electrodes 190 of a second column, e.g., a right column. Here, a vertical direction may be an extending direction of the data line, and a horizontal direction may be direction perpendicular to the vertical direction when viewed from a plane view in a thickness direction of the lower panel of the liquid crystal display.

Two thin film transistors TFT, which are connected to the pixel electrodes 190 included in one column of pixel electrode 190s and vertically adjacent to each other, are connected to the gate lines G(i-1) and G(i-2) that are different from each other and the data lines Dj, D(j+1) and D'(j+1) that are different from each other. In such an embodiment, the gate lines G(i-1) and G(i-2) that are different from each other may be connected to each other, that is, the ends thereof are connected to one gate line Gi such that a same gate-on voltage is simultaneously applied thereto. The data lines Dj, D'j, D(j+1) and D'(j+1) are not connected to each other such that data voltages that are different from each other may be applied to the two thin film transistors TFT vertically adjacent to each other.

The connection relationship of four adjacent pixel electrodes 190, the thin film transistors TFT, the gate lines G(i-1) and G(i-2), and the data lines Dj, D'j, D(j+1), and D'(j+1) will be described in detail with reference to FIG. 1.

FIG. 1 shows four pixel electrodes 190 adjacent vertically and horizontally. Each pixel electrode 190 is connected a corresponding thin film transistor TFT, that is, an output terminal thereof.

Among the thin film transistors TFT connected to the gate lines G(i-1) and G(i-2), the thin film transistors TFT disposed on a same row are connected to a same gate line, and the thin film transistors TFT disposed on different rows are connected to different gate lines. Each of the gate lines G(i-1) and G(i-2) is disposed between the pixel electrodes, and side ends of two gate lines G(i-1) and G(i-2) are merged into a single gate line Gi, thereby receiving a same gate signal. When the gate lines receiving a same gate signal are referred to as one gate line, the number of the gate lines may be half of that of the rows of the pixel electrodes 190. On the other hand, the number of all gate lines extending horizontally is the same as the number of the rows of the pixel electrodes 190.

Input terminals of the thin film transistors TFT are connected to the data lines Dj, D'j, D(j+1), and D'(j+1), and the thin film transistors TFT vertically adjacent to each other may be connected to different data lines. In an exemplary embodiment, when the gate signal applied to the thin film transistors TFT is the same as each other, the thin film transistors TFT are connected to different data lines, respectively. In an exemplary embodiment, as shown in FIG. 1, the thin film transistor TFT disposed at the left-upper side is connected to the data line Dj disposed at the left side among a pair of data lines Dj and D'j, and the thin film transistor TFT disposed at the left-lower side is connected to the data line D'j disposed at the right side. In an exemplary embodiment, as shown in FIG. 1, the thin film transistor TFT disposed at the right-upper side is connected to the data line D(j+1) disposed at the left side, and the thin film transistor TFT disposed at the right-lower side is connected to the data line D'(j+1) disposed at the right side. In an alternative exemplary embodiment, the thin film transistor TFT disposed at the right-upper side may be connected to the data line D'(j+1) disposed at the right side, and the thin film transistor TFT disposed at the right-lower side may be connected to the data line D(j+1) disposed at the left side.

In an exemplary embodiment, a pair of data lines is disposed to extend vertically along the pixel electrode 190. In such an embodiment, if the pixel electrode 190 is divided into the left region and the right region based on the center of the pixel electrode 190, the pair of data lines may be disposed at the left region and the right region of the pixel electrode 190, respectively. In such an embodiment, the data line may be disposed while crossing a normal center of the left region or the right region. In an exemplary embodiment, as above-described, the data lines Dj, D'j, D(j+1), and D'(j+1) overlap the pixel electrode 190, such that the interval between the pixel electrodes 190 adjacent to each other in the horizontal direction may be reduced, thereby reducing an area covered by a black matrix BM. As a result, in such an embodiment, a transmittance is improved.

In an exemplary embodiment, the thin film transistor TFT, the gate lines Gi, G(i−1), and G(i−2), and the data lines Dj, D'j, D(j+1), and D'(j+1) in the display panel may be connected as described above.

Such a structure of FIG. 1 may be disposed in the lower panel among liquid crystal panels constituting the liquid crystal display. The liquid crystal panel includes the lower panel and an upper panel, and a liquid crystal layer interposed between the lower and upper panels. In an exemplary embodiment, the liquid crystal display further includes a backlight unit.

The structure of the liquid crystal display will be described with reference to FIG. 2.

Figure 2:
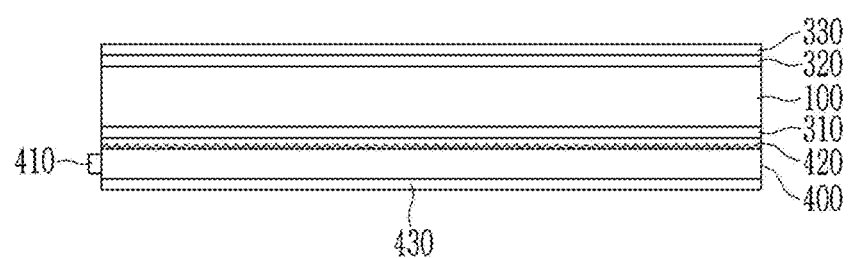
FIG. 2 is a cross-sectional view showing an entire structure of a liquid crystal display according to an exemplary embodiment.

FIG. 2 is a cross-sectional view showing an entire structure of a liquid crystal display according to an exemplary embodiment.

In an exemplary embodiment, as shown in FIG. 2, the liquid crystal display includes the liquid crystal panel (100, 310, 320 and 330) and the backlight unit (400, 410, 420 and 430).

The liquid crystal panel includes a display panel 100, a lower polarizer 310, an upper polarizer 320, and a diffusion layer 330.

In an exemplary embodiment, although not shown in FIG. 2, the display panel 100 includes the upper panel and the lower panel, and the liquid crystal layer interposed therebetween. In such an embodiment, as described above with reference to FIG. 1, the pixel electrode 190, the gate line, the data line, and the thin film transistor TFT are disposed in the lower panel. In such an embodiment, a common electrode 270 (shown in FIG. 3) is disposed in the upper panel, and an opening is defined in the common electrode 270. An arrangement direction of the liquid crystal molecules included in the liquid crystal layer is changed depending on an electric field generated by the pixel electrode 190 and the common electrode 270. In an exemplary embodiment, the liquid crystal molecules are a liquid crystal of a vertically aligned ("VA") mode in which the liquid crystal molecules are aligned vertically, e.g., in a perpendicular direction with respect to the upper or lower panel, in the absence of the electric field.

The lower polarizer 310 and the upper polarizer 320 are disposed, e.g., attached, on both surfaces of the display panel 100. Since each of the two polarizers 310 and 320 have a transmissive axis, light having a polarization characteristic parallel to the transmissive axis is transmitted and light having the polarization characteristic of the direction perpendicular to the transmissive axis is blocked. The transmissive axes of the two polarizers 310 and 320 may be perpendicular to each other.

The diffusion layer 330 is disposed on the upper polarizer 320. In an exemplary embodiment, the diffusion layer 330 has a characteristic of diffusing light in one direction. Here, the one direction may be the direction parallel to the short side direction of the liquid crystal panel, and the short side direction of the liquid crystal panel may be the same as the extending direction of the data line. That is, the diffusion layer 330 diffuses light emitted toward the front surface of the liquid crystal panel to the short side direction of the liquid crystal panel, thereby obtaining an effect of increasing the luminance when viewing in the upper side or lower side of the front surface of the liquid crystal panel.

In an exemplary embodiment, the backlight unit of the liquid crystal display includes a light source 410, a light guide 400, a reflection sheet 430, and a prism sheet 420.

The light source 410 includes a light emitting diode ("LED"), etc., and may emit light to be provided to the liquid crystal panel.

In an exemplary embodiment, as shown in FIG. 2, light emitted from the light source 410 is incident to the side surface of the light guide 400. The light guide 400 transmits the light to an end thereof where the light source 410 is not provided, and the reflection sheet 430 is configured in a way such that the light is not emitted downward. The light incident to the reflection sheet 430 is reflected back to the light guide 400. The light passing through the light guide 400 and the reflection sheet 430 is incident to the prism sheet 420 disposed thereon.

The prism sheet 420 includes a plurality of prism structure members arranged in parallel to each other, and each prism structure member has a cross-section of a triangle and includes a prism hill extending long in one direction. One corner of the triangular cross-sectionals of the prism structure member forms the prism hill. The prism hill protrudes toward the rear surface of the liquid crystal display. In such an embodiment, the prism hill is positioned toward the light guide 400 or the reflection sheet 430. In such an embodiment, the prism structure member is disposed at the lower surface of the prism sheet 420, and the upper surface of the prism sheet 420 toward the liquid crystal panel has a flat structure.

In an exemplary embodiment, the backlight unit may include a single prism sheet 420. In such an embodiment, the extending direction of the prism hill is only one direction. In such an embodiment, the extending direction of the prism hill is the short side direction of the liquid crystal panel. The short side direction of the liquid crystal panel is the same as the extending direction of the data line and the length direction of the pixel electrode 190.

FIG. 2 shows the cross-sectional structure of the triangle taken along the direction perpendicular to the extending direction of the prism hill of the prism sheet 420.

In such an embodiment, since the prism sheet 420 is defined by a single sheet, a prism sheet matching the long side direction of the liquid crystal panel or having a prism hill extending in a same direction as the gate line is not provided.

Such a prism sheet 420 has the prism hill extending in the short side direction (the direction of the data line) of the liquid crystal panel, thereby the light is refracted and progresses in the direction perpendicular thereto. In such an embodiment, the light incident to the prism sheet 420 is refracted from the prism surface, which is obliquely formed, to both sides based on the prism hill and progresses in the left/right side directions. As a result, the light progressing in the direction (the long side direction of the liquid crystal panel or the direction of the gate line) perpendicular to the short side direction (the direction of the data line) of the liquid crystal panel is further increased. (Referring to FIG. 18)

In an exemplary embodiment, as above described, where a single prism sheet 420 is used, the light progressing in the long side direction of the liquid crystal panel is increased such that the light progressing in the short side direction of the liquid crystal panel may be relatively decreased. In such an embodiment, the display panel 100 includes the diffusion layer 330 having the characteristic of diffusing the light in the short side direction of the liquid crystal panel on the display panel 100 to compensate the decrease of the light progressing in the short side direction of the liquid crystal panel, such that the light may be entirely and uniformly transmitted. (Referring to FIG. 21)

The path through which the light passes will hereinafter be described with reference to FIG. 2.

The light emitted from the light source 410 is transmitted through the light guide 400, and the reflection sheet 430 disposed at the lower surface of the light guide 400 transmits the light emitted below the light guide 400 to the prism sheet 420 or an upper side. The light enters the lower polarizer 310 of the display panel 100, while the light further includes the component of the light transmitted to the left and right directions (the long side direction of the liquid crystal panel) when the light passes through the prism sheet 420. Only the light having the same polarization characteristic as the transmissive axis of the lower polarizer 310 is transmitted and enters the display panel 100. The phase retardation of the light changes while passing through the liquid crystal layer of the display panel 100 such that the polarization characteristic may be changed of the light, and the transmission degree for the upper polarizer 320 is changed according to the changed polarization characteristic of the light. The light passing through the upper polarizer 320 is diffused in the up and down directions (the short side direction of the liquid crystal panel) while passing through the diffusion layer 330, and displays the image with light, the characteristic of which changed by the prism sheet 420 is compensated.

FIG. 2 shows an exemplary embodiment in which the light source 410 is disposed at a side surface of the light guide 400. However, the invention is not limited thereto. According to an alternative exemplary embodiment, the backlight may have a direct-type structure, in which a hole is defined in the reflection sheet 430 and a light source is disposed in the corresponding hole. In such an embodiment, a lens may be disposed on the light source and the light guide may be omitted.

Next, the pattern of the pixel electrode and the common electrode among the structure of the display panel 100 will be described with reference to FIG. 3.

Figure 3:
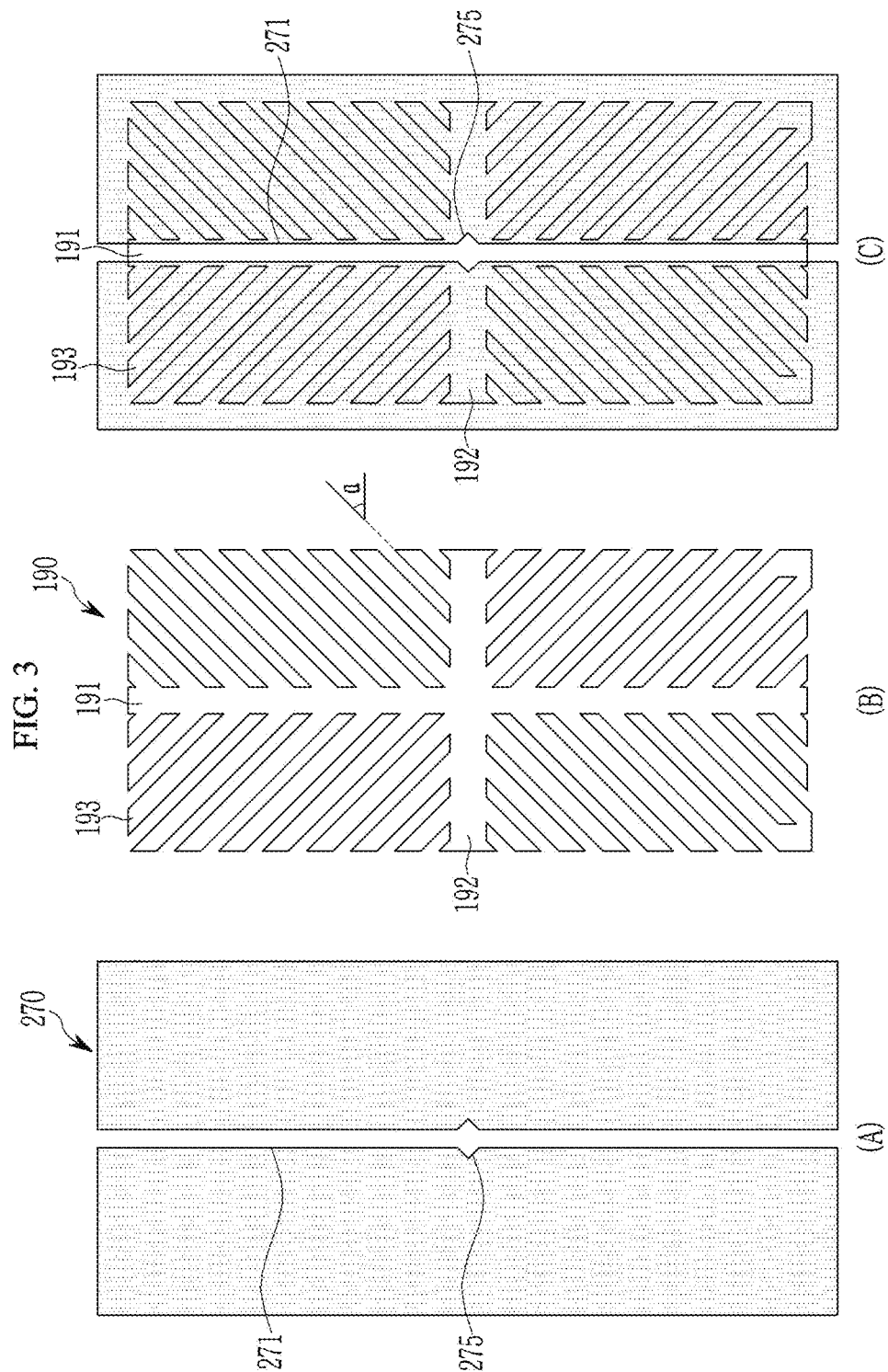
FIG. 3 is a top plan view showing a structure of a pixel electrode and a common electrode in a pixel according to an exemplary embodiment.

FIG. 3 is a top plan view showing a structure of a pixel electrode and a common electrode in a pixel according to an exemplary embodiment.

FIG. 3 (A) shows a structure of a part of the common electrode 270 corresponding to the pixel electrode 190 according to an exemplary embodiment. Referring to FIG. 3 (A), a longitudinal opening 271 and a notch opening 275 are defined in the common electrode 270 disposed in the upper panel. The longitudinal opening 271 extends in a same direction as the extending direction of the data line. Also, one notch opening 275 may be defined for every pixel electrode 190, and may be disposed at the position corresponding to the predetermined position of the pixel electrode 190 among the longitudinal opening 271. Common electrodes 270 are formed to be connected to each other between the adjacent pixel electrodes 190.

In an exemplary embodiment, the notch opening 275 may have one of various shapes, e.g., a shape extending in the direction perpendicular to the longitudinal opening 271. Alternatively, the notch opening 275 may be omitted.

In an exemplary embodiment, a protrusion structure may be provided in the common electrode 270 instead of the openings 271 and 275. The protrusion structure may be provided by forming an additional protrusion pattern on the common electrode 270.

FIG. 3 (B) shows the structure of a pixel electrode 190 according to an exemplary embodiment. Referring to FIG. 3 (B), the pixel electrode 190 includes a longitudinal electrode 191 having a bar shape, a transverse electrode 192 having a bar shape, and a branch electrode 193 extending from the longitudinal electrode 191 or the transverse electrode 192 in an oblique direction. The branch electrode 193 forms a predetermined angle α with the transverse electrode 192. FIG. 3 (B) shows an exemplary embodiment in which the branch electrode 193 forms an angle of about 45° with the transverse electrode 192. However, the invention is not limited thereto. According to an alternative exemplary embodiment, an angle exceeding 45° may be formed. In an exemplary embodiment, the pixel electrode 190 is divided into four domains by the longitudinal electrode 191 and the transverse electrode 192, and the branch electrodes 193 included in one domain may extend in a direction parallel to each other and may be arranged with a predetermined interval.

FIG. 3 (C) shows a structure in which the pixel electrode 190 and the common electrode 270 are disposed to overlap each other. When the upper panel including the common electrode 270 and the lower panel including the pixel electrode 190 are assembled, the pixel electrode 190 and the common electrode 270 are aligned to overlap each other as shown in FIG. 3 (C).

As shown in FIG. 3 (C), the longitudinal electrode 191 of the pixel electrode 190 overlaps the longitudinal opening 271 of the common electrode 270. In such an embodiment, the notch opening 275 of the common electrode 270 is defined to overlap a part where the longitudinal electrode 191 and the transverse electrode 192 cross each other. In an exemplary embodiment, the part of the pixel electrode 190 where the longitudinal electrode 191 and the transverse electrode 192 cross each other has a width substantially the same as a width of the longitudinal electrode 191 or a width of the transverse electrode 192 such that the part is not expanded from the longitudinal electrode 191 and the transverse electrode 192.

Next, an arrangement direction of the liquid crystal molecule for the electrode structure of FIG. 3 will be described with reference to FIG. 4.

Figure 4:
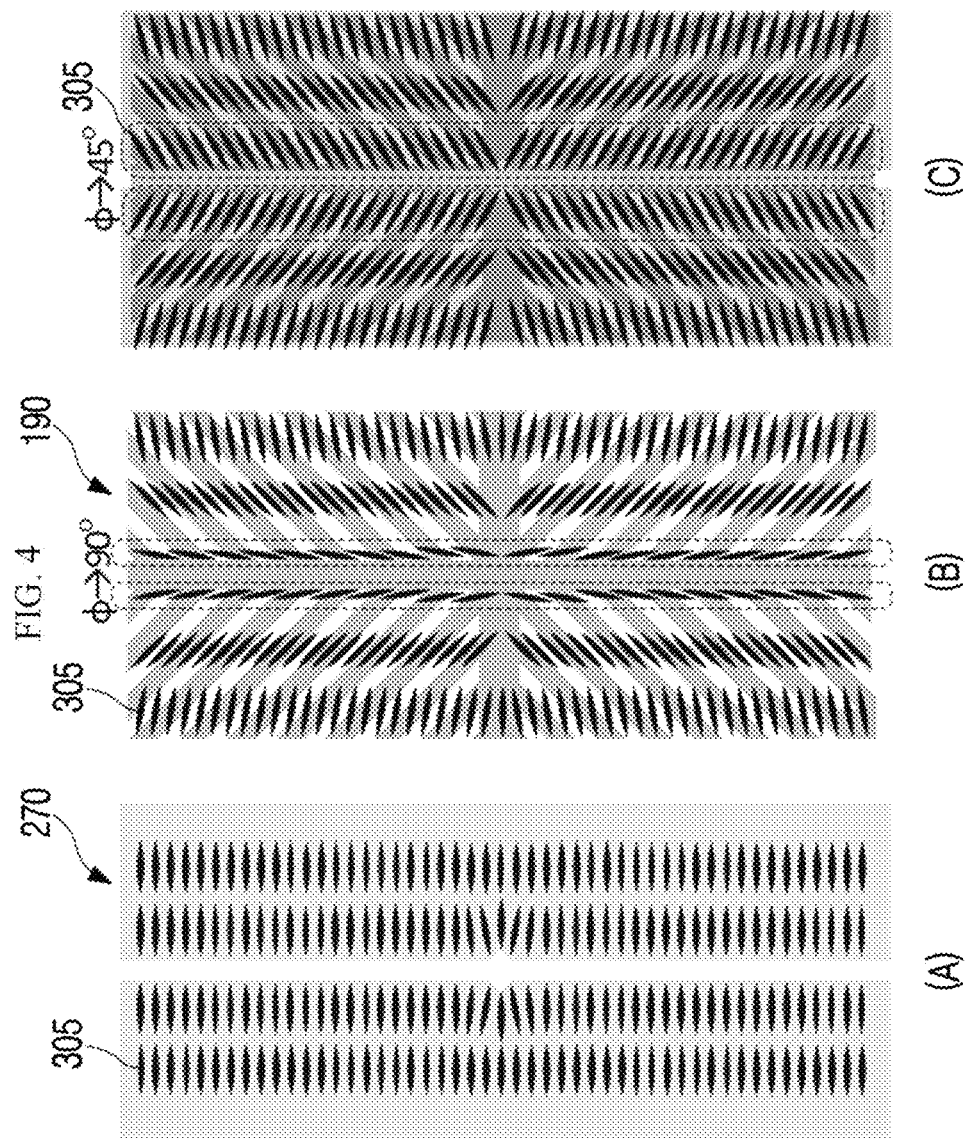
FIG. 4 is a view showing an arrangement of liquid crystal molecules according to an electrode structure of FIG. 3.

FIG. 4 is a view showing an arrangement of liquid crystal molecules according to an electrode structure of FIG. 3.

Hereinafter, the angle ϕ will be used to describe the arrangement of the liquid crystal molecules, and the angle ϕ is defined as follows.

The angle ϕ of the liquid crystal molecule means the angle of the long axis of the liquid crystal molecule 305 with the transverse electrode 192 of the pixel electrode 190 after projecting the long axis direction of the liquid crystal molecule 305 having a three-dimensional structure to the surface of the pixel electrode 190 parallel to the substrate surface of the display panel 100. The direction of the transverse electrode 192 is the same as the extending direction of the gate line, that is, a direction perpendicular to the direction of the longitudinal opening 271 and the longitudinal electrode 191.

FIG. 4 (A) shows the shape of the liquid crystal molecules 305 arranged adjacent to the common electrode 270.

Referring to FIG. 4 (A), the liquid crystal molecule 305 adjacent to the common electrode 270 is arranged along one side edge of the longitudinal opening 271, and the long axis direction of the liquid crystal molecule 305 is aligned in a direction (i.e., the extending direction of the gate line) perpendicular to the longitudinal opening 271. As a result, the angle ϕ of the liquid crystal molecule 305 is about 0°. In such an embodiment, the liquid crystal molecule 305 arranged near the edge of the notch opening 275 is arranged in the different direction from the liquid crystal molecule 305 along the longitudinal opening 271. The long axis direction of the liquid crystal molecule 305 is entirely aligned in the direction (the angle ϕ is about 0°) perpendicular to the longitudinal opening 271 except for the liquid crystal molecule 305 near the notch opening 275.

FIG. 4 (B) shows the shape of the liquid crystal molecule 305 arranged adjacent to the pixel electrode 190.

Referring to FIG. 4 (B), the angle ϕ of the liquid crystal molecule 305 disposed near the longitudinal electrode 191 of the pixel electrode 190 is about 90° with respect to the transverse electrode 192. In such an embodiment, the liquid crystal molecule 305 is arranged to be substantially parallel to the transverse electrode 192 on the right and left edges of the pixel electrode 190, such that the angle ϕ is almost 0°. The arrangement of the liquid crystal molecules 305 between the longitudinal electrode 191 and the left and right edges (hereinafter referred to as 'a middle part') forms a middle angle of two angle ϕ on the part where the longitudinal electrode 191 is disposed and the part (hereinafter referred to as 'a middle part') at the left and right edges such that the angle ϕ of the liquid crystal molecule 305 between the longitudinal electrode 191 and the left and right edges is about 45°.

FIG. 4 (A) shows a part of the liquid crystal molecules 305 close to the upper panel in the liquid crystal layer because the liquid crystal molecule 305 is close to the common electrode 270, and FIG. 4 (B) shows a part of the liquid crystal molecules 305 close to the lower panel in the liquid crystal layer because the liquid crystal molecule 305 is close to the pixel electrode 190.

Since the liquid crystal layer is disposed between the upper panel and the lower panel, the angle ϕ of the liquid crystal molecule disposed between those shown in FIGS. 4 (A) and (B), that is, the angle ϕ for the liquid crystal molecule of the middle layer departed from and upper panel and the lower panel by a predetermined distance, will be described with reference to FIG. 4 (C).

The liquid crystal molecule 305 of the middle layer has a middle angle ϕ between the angle ϕ of the liquid crystal molecule 305 of FIG. 4 (A) and FIG. 4 (B), as shown in FIG. 4 (C). In such an embodiment, since the angles ϕ of 0° and 90° are formed on the parts corresponding to the longitudinal electrode 191 and the longitudinal opening 271, the liquid crystal molecule 305 of the middle layer may have an angle of 45° as the middle angle therebetween. The liquid crystal molecule 305 of the middle layer corresponding to the left and right edge of the pixel electrode 190 has an angle of about 0 because the angle is 0° near the common electrode 270 and the angle near the pixel electrode 190 is almost 0°.

In such an embodiment, the liquid crystal molecules 305 corresponding to the middle layer of the middle part are affected by the angle of all adjacent liquid crystal molecules. As a result, the middle angle between 0° and 45° is formed.

Accordingly, as described above, the liquid crystal molecule disposed at the middle layer of the middle part may be arranged with an angle of 45° or less.

In an exemplary embodiment, the transmittance has a maximum value when the angle ϕ of the liquid crystal molecule 305 is 45°, and it has a minimum value in the case of 0° or 90°. Therefore, to improve the transmittance, it is desired to increase the angle ϕ of the liquid crystal molecule in the middle layer of the middle part to be about 45°, as will be described with reference to FIG. 5.

Figure 5:
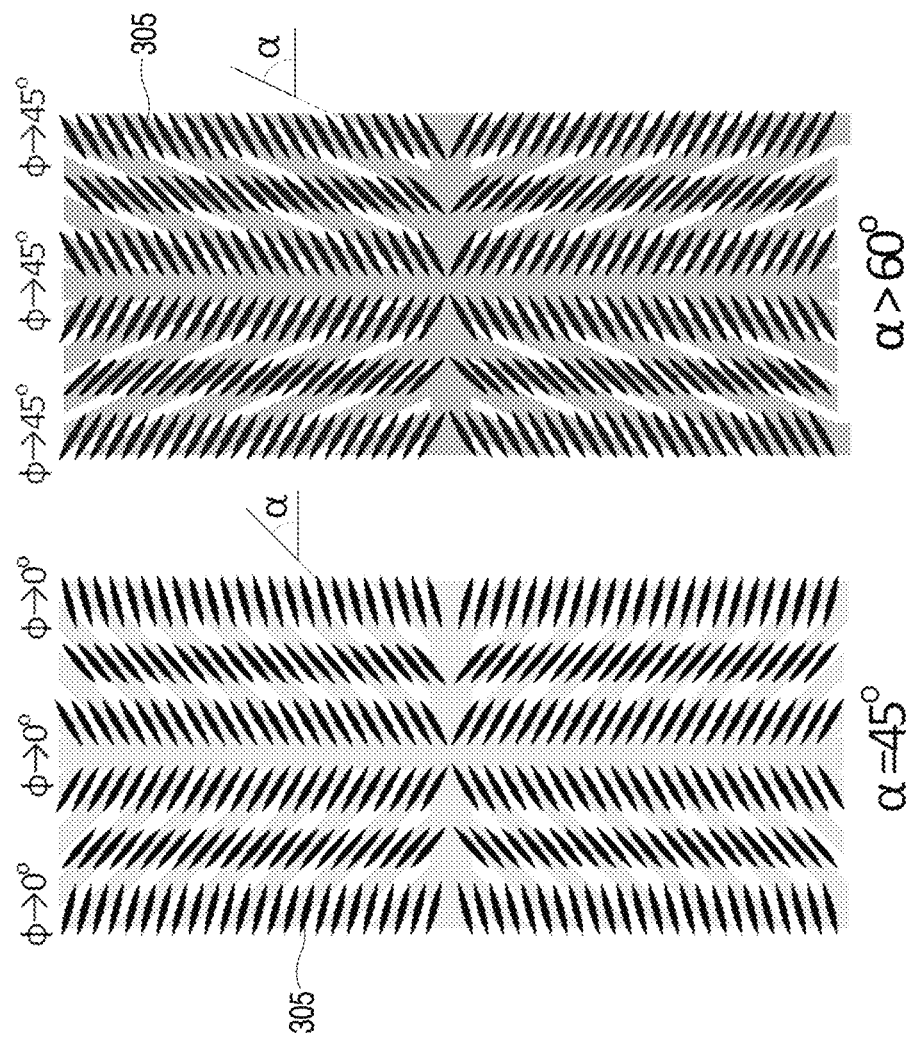
FIG. 5 is a view showing an arrangement of liquid crystal molecules depending on an angle of a branch electrode in a pixel electrode according to an exemplary embodiment.

FIG. 5 is a view showing an arrangement of a liquid crystal molecule depending on an angle of a branch electrode in a pixel electrode according to an exemplary embodiment.

In FIG. 5, an exemplary embodiment in which the angle α between the branch electrode 193 and the transverse electrode 192 is 45° is shown at the left side, and an exemplary embodiment in which the angle α is 60° or more is shown at the right side. Also, FIG. 5 shows the angle ϕ of the liquid crystal molecule in the middle layer.

First, as shown in FIGS. 4 and 5, the angle α between the branch electrode 193 and the transverse electrode 192 is about 45°, and the angle ϕ of the liquid crystal molecule 305 may be less than about 45° in the middle layer of the middle part.

In an exemplary embodiment, as shown in the right side of FIG. 5, when the angle α of the branch electrode 193 is about 60° or more, the angle ϕ of the liquid crystal molecule 305 disposed at the middle layer of the middle part may be about 45°.

As a result, in such an embodiment, the transmittance is increased. The change of the transmittance according to the angle α of the branch electrode 193 will hereinafter described with reference to FIG. 6.

Figure 6:
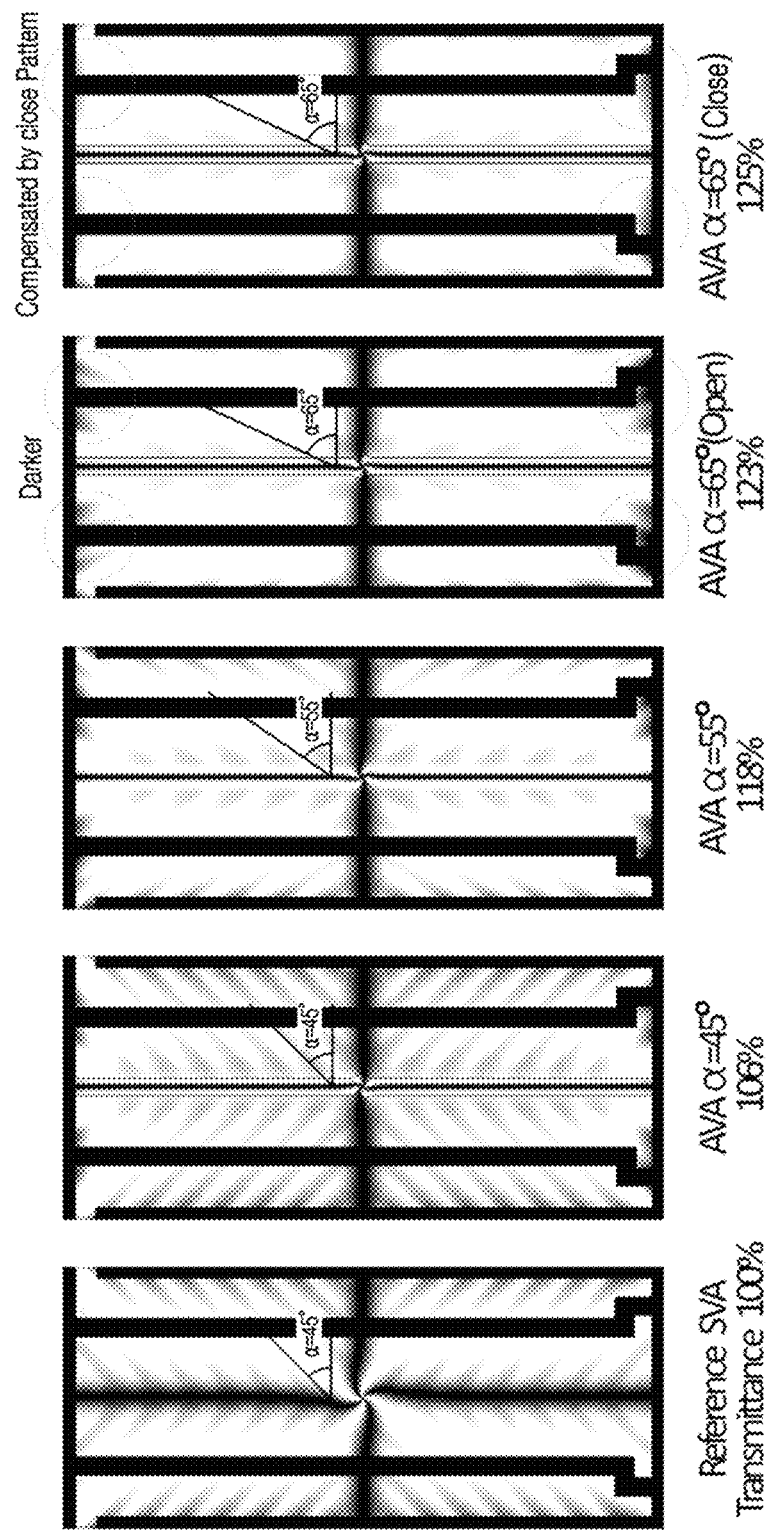
FIG. 6 is a view showing transmittance depending on an angle of a branch electrode in a pixel electrode according to an exemplary embodiment.

FIG. 6 is a view showing transmittance depending on an angle of a branch electrode in a pixel electrode according to an exemplary embodiment.

FIG. 6 shows the transmittance according to a comparative example (Reference SVA) and the transmittance change according to the angle α of the branch electrode 193.

First, the comparative example (Reference SVA) has a structure in which the pattern of the pixel electrode 190 is the same as an exemplary embodiment described above, but the opening is not separately formed in the common electrode 270, and the change of the transmittance in exemplary embodiments is shown in FIG. 6 when the transmittance of the comparative example (Reference SVA) is considered as 100.

A black line in the view showing a transmission degree in FIG. 6 represents the data line, the gate line, the storage electrode, etc. In FIG. 6, two lines vertically crossing the center of the pixel electrode correspond to the data lines, the horizontal lines disposed above and below the pixel electrode correspond to the gate lines, and the line disposed near both edges of the pixel electrode correspond to the storage electrode.

In FIG. 6, when the angle α of the branch electrode 193 is about 45°, the transmittance is improved as 106% compared with the comparative example. It may be shown that the black color is reduced at the longitudinal electrode 191 part of the pixel electrode 190 due to the longitudinal opening 271 formed in the common electrode 270, and as a result, the transmittance is improved.

In FIG. 6, when the angle α of the branch electrode 193 is about 55°, it may be shown that the transmittance is improved as 118%. While the angle α of the branch electrode 193 is increased and then the angle of the liquid crystal molecule disposed at the corresponding part is increased to be close to 45°, the transmittance is improved.

The views at the right side of FIG. 6 show two exemplary embodiments where the angle α of the branch electrode 193 is about 65°. The second view from the right side shows an exemplary embodiment where the angle α of the branch electrode 193 is 65°, and the pixel electrode 190 has the longitudinal electrode 191, the transverse electrode 192 and the branch electrode 193 as shown in FIG. 3 (B).

Figure 7:
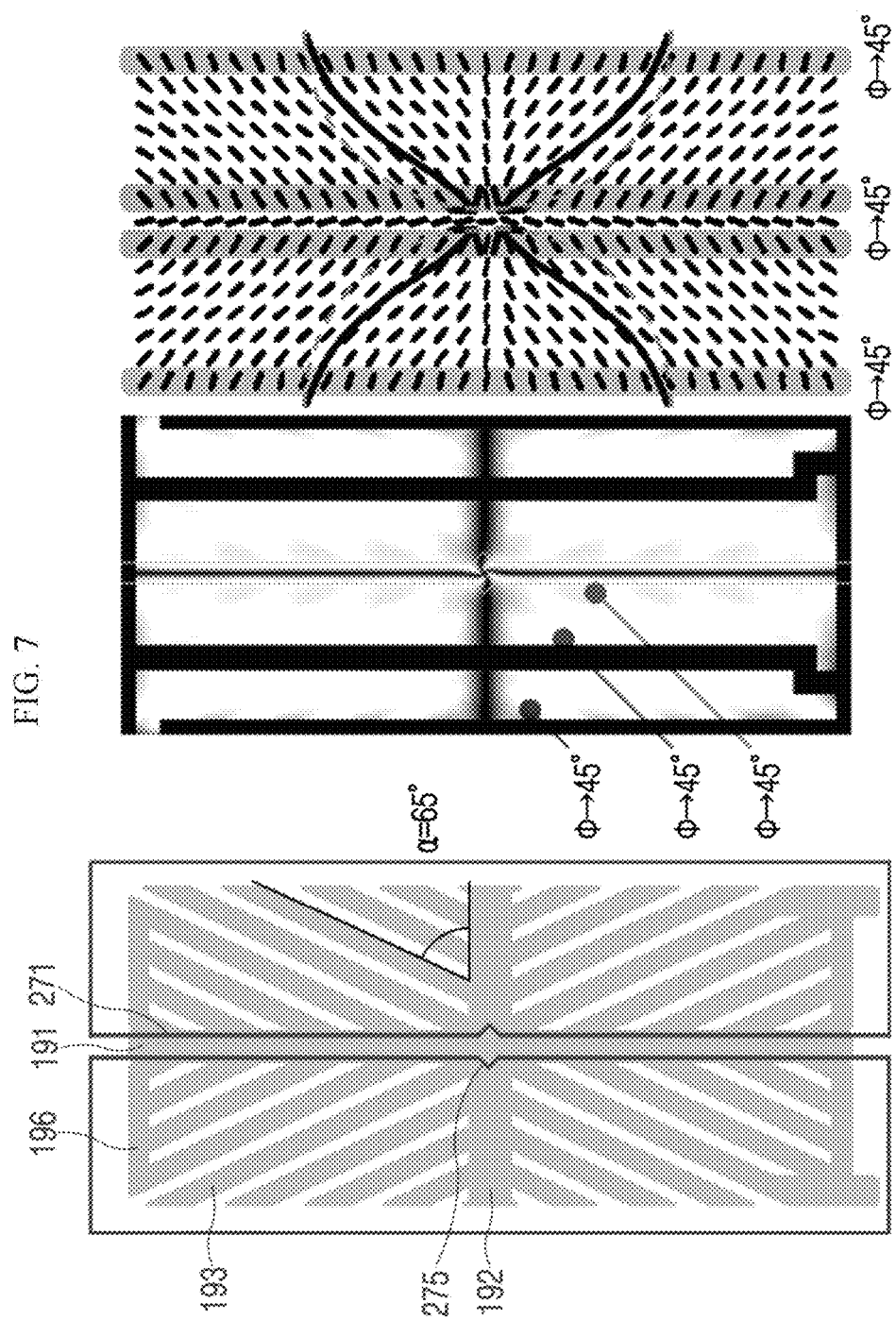
FIG. 7 is a view of a structure of a pixel electrode, an arrangement of liquid crystal molecules, and transmittance according to an exemplary embodiment.

The view at the rightmost side shows an exemplary embodiment where the edge transverse electrode is disposed above and below the pixel electrode 190 as shown in FIG. 7.

In such an embodiment, referring to FIG. 6, when the angle α of the branch electrode 193 is 65° and the edge transverse electrode is additionally formed in the pixel electrode 190, the highest transmittance may be obtained as the transmittance of 125%. That is, comparing the drawing of the rightmost side and the drawing of the second right side in FIG. 6, it may be shown that the black degree is differentiated at the part adjacent to the edge transverse electrode. That is, the transmittance of the corresponding part is improved due to the edge transverse electrode such that the transmittance is improved from 123% to 125%.

Next, the rightmost structure of FIG. 6 will be described in detail with reference to FIG. 7.

FIG. 7 is a view of a structure of a pixel electrode, an arrangement of liquid crystal molecules, and transmittance according to an exemplary embodiment.

First, the structure of the pixel electrode 190 will be described.

According to an exemplary embodiment, as shown in FIG. 7, one pixel electrode 190 includes the longitudinal electrode 191, the transverse electrode 192, the branch electrode 193 and the edge transverse electrode 196 connecting the branch electrode 193 and the longitudinal electrode 191. The edge transverse electrode 196 may be parallel to the transverse electrode 192. The branch electrode 193 forms an angle α of about 65° with the transverse electrode 192. The edge transverse electrode 196 connects upper ends of the branch electrodes 193, so that the upper ends of the branch electrodes 193 are not opened. In such an embodiment, four domains defined by the longitudinal electrode 191 and the transverse electrode 192 have the structure that is opened on the left and right edges and is closed on the upper and lower edges.

The common electrode 270 has the same structure as that of FIG. 3 (A). In such an embodiment, the common electrode 270 includes the longitudinal opening 271 and the notch opening 275, the longitudinal opening 271 is disposed at the position overlapping the longitudinal electrode 191, while the notch opening 275 is formed to overlap the position where the longitudinal electrode 191 and the transverse electrode 192 cross each other.

In such an embodiment, as described above, the angle ϕ of the liquid crystal molecules 305 disposed at various positions is about 45°. Therefore, the transmittance is substantially high.

Referring to FIG. 7, if the branch electrode 193 has an angle in a range of about 60 degrees to about 80 degrees with the transverse electrode 192 the angle ϕ of the liquid crystal molecule 305 corresponding thereto is about 45° such that the transmittance is improved.

Next, a difference of transmittance according to the comparative example and an exemplary embodiment will be described with reference to FIG. 8.

Figure 8:
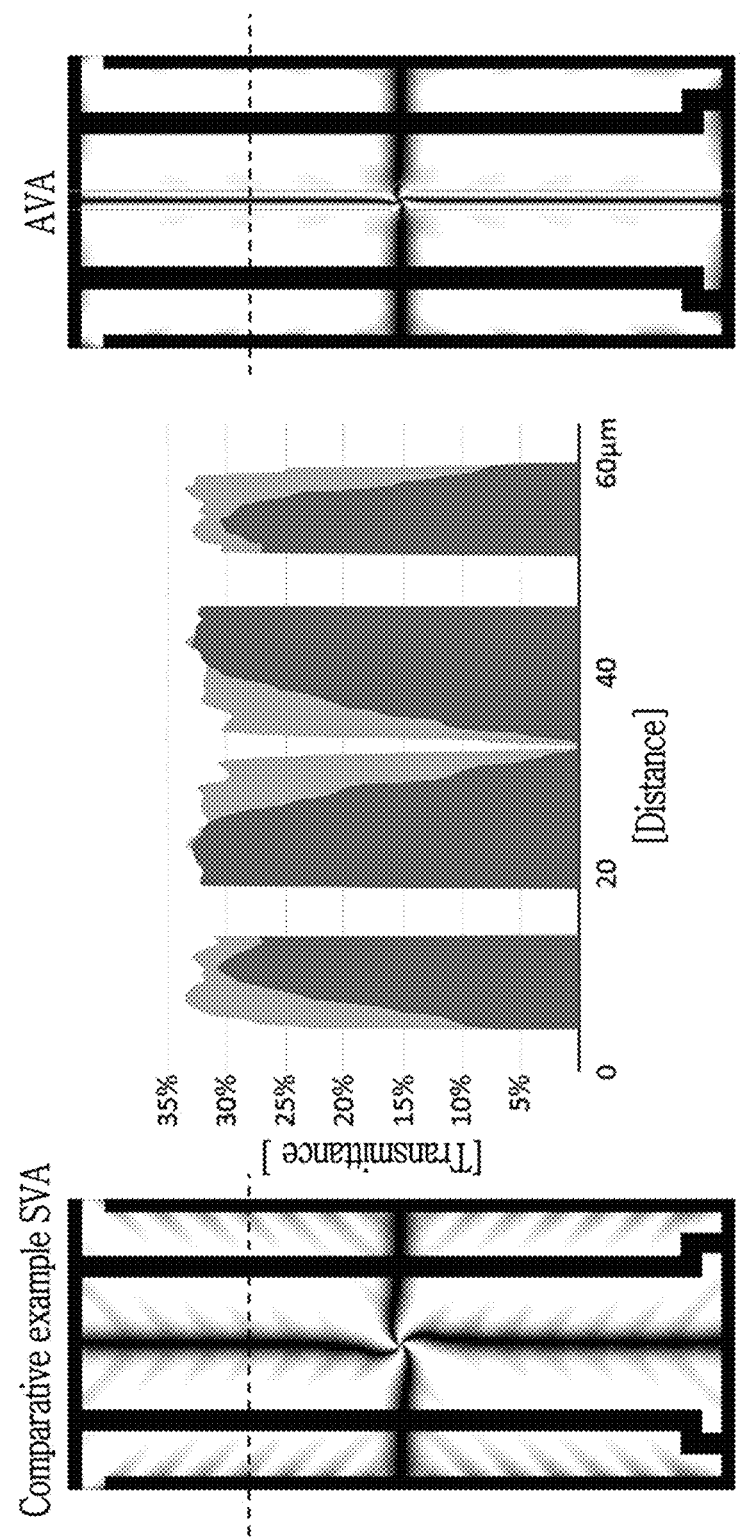
FIG. 8 is a view showing transmittance according to a comparative example and an exemplary embodiment.

FIG. 8 is a view showing transmittance according to a comparative example and an exemplary embodiment.

First, the comparative example on the left side has a structure in which the opening is not formed in the common electrode 270, and the exemplary embodiment on the right side has a structure shown in FIG. 7.

The transmittance at the same position for the left pixel and the right pixel is shown in a graph in the middle. In the graph, a vertical axis represents the transmittance, and a horizontal axis represents a distance from the left end of the pixel. A width of the pixel electrode in the exemplary embodiment is about 60 micrometers (μm).

In an exemplary embodiment, as shown in the graph of FIG. 8, the transmittance is improved on the edge of the pixel electrode, and the transmittance is also improved near the longitudinal electrode 191 of the pixel electrode 190 due to the longitudinal opening 271 of the common electrode 270. As a result, the overall transmittance may be improved by about 25%.

Next, the arrangement of the liquid crystal molecules will be described with reference to FIG. 9.

Figure 9:
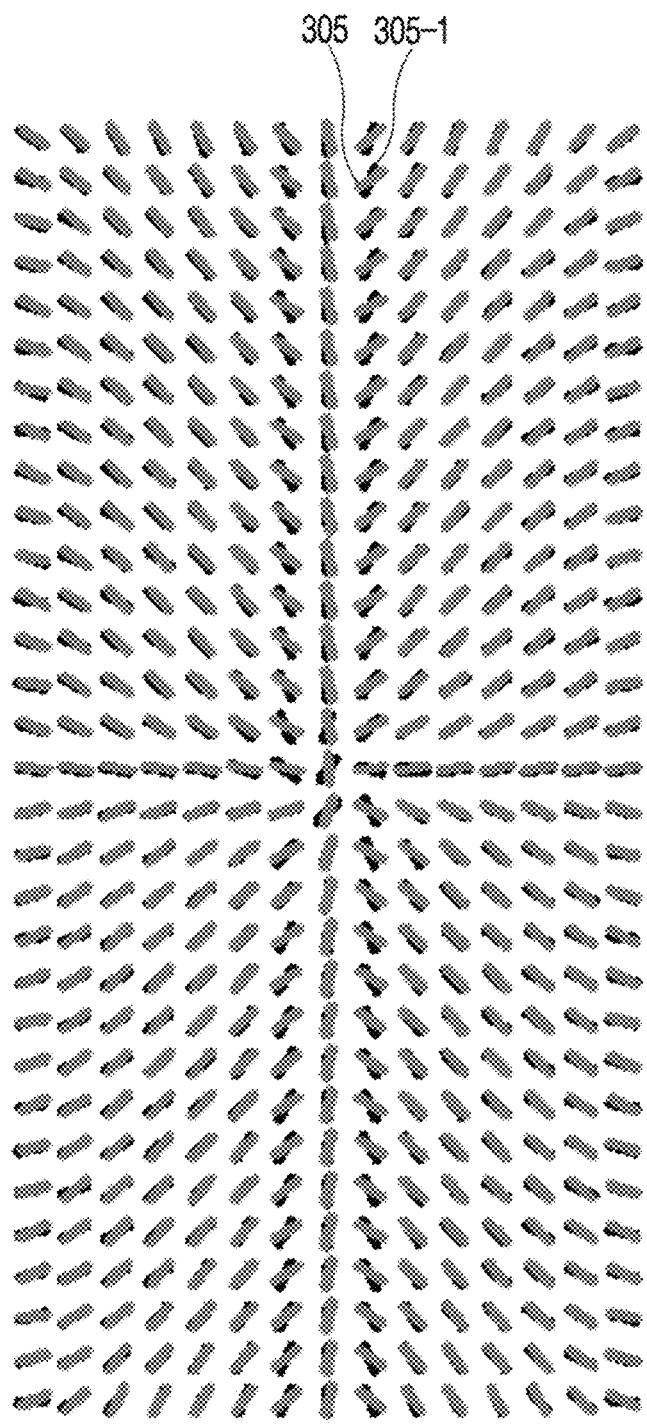
FIG. 9 is a view showing an arrangement of liquid crystal molecules according to a comparative example and an exemplary embodiment.

FIG. 9 is a view showing an arrangement of liquid crystal molecules according to a comparative example and an exemplary embodiment.

In FIG. 9, the liquid crystal molecules of an exemplary embodiment are indicated by 305, and the liquid crystal molecules of the comparative example is indicated by 305-1. Also, in FIG. 9, the arrangements of the liquid crystal molecule of the comparative example and the exemplary embodiment corresponding to FIG. 8 are shown to be overlapped.

The liquid crystal molecule 305-1 of the comparative example and the liquid crystal molecule 305 of the exemplary embodiment are similar at most positions, the angle of the part where the longitudinal opening 271 of the common electrode 270 is disposed are substantially different from each other. It may be shown that the liquid crystal molecule 305 of the exemplary embodiment is arranged with an angle corresponding to about 45° such that the transmittance is high, and the liquid crystal molecule 305-1 of the corresponding part of the comparative example is arranged in a direction close to the vertical direction such that the transmittance is low.

Next, the change of the transmittance characteristic according to the position and existence of the notch opening 275 will be described with reference to FIG. 10.

Figure 10:
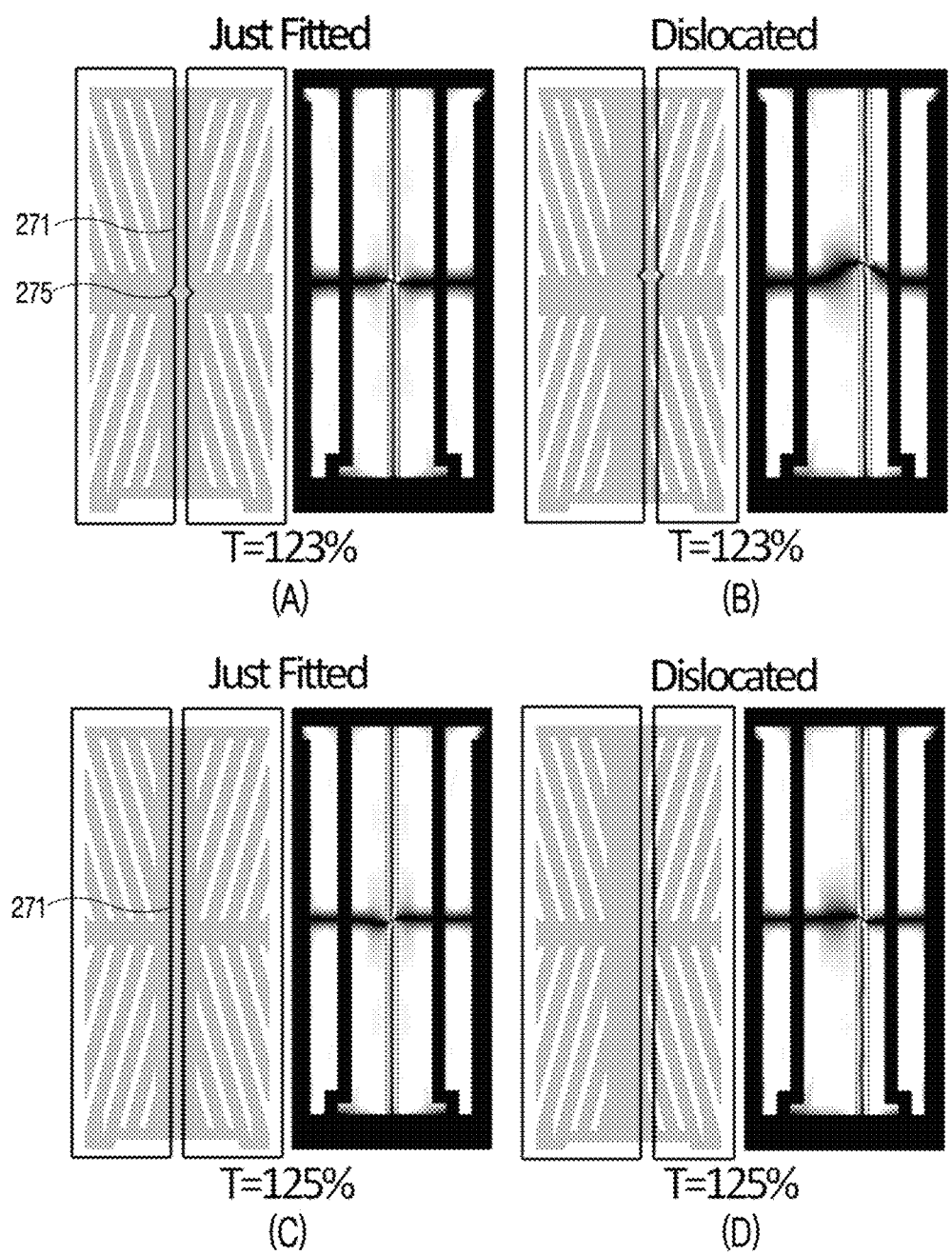
FIG. 10 is a view showing a characteristic change depending on a change of a notch in a common electrode according to an exemplary embodiment.

FIG. 10 is a view showing a characteristic change depending on a change of a notch in a common electrode according to an exemplary embodiment.

In FIG. 10, FIG. 10 (C) and FIG. 10 (D) show exemplary embodiments in which the common electrode 270 only includes the longitudinal opening 271 for the pixel electrode 190 including the edge transverse electrode 196, and FIG. 10

(A) and FIG. 10 (B) show exemplary embodiments in which the common electrode 270 includes both of the longitudinal opening 271 and the notch opening 275.

Also, FIG. 10 (B) and FIG. 10 (D) show exemplary embodiments in which the position of the longitudinal opening 271 is disposed at the position that does not correspond to the longitudinal electrode 191 of the pixel electrode 190.

Overall, as shown in FIG. 10, even if the position of the longitudinal opening 271 does not correspond to the longitudinal electrode 191 and is mismatched, the change in the transmittance is substantially small. However, as shown in FIG. 10, a stain may be visible.

In exemplary embodiments without the notch opening 275, as shown in FIG. 10 (C) and FIG. 10 (D), the transmittance is slightly increased from 123% to 125%.

In exemplary embodiments where the notch opening 275 exists, the arrangement direction of the liquid crystal molecules may be effectively determined even though four domains overlap each other, and thus, the liquid crystal molecule may be substantially stable.

Next, the characteristic on a side surface will be described with reference to FIG. 11.

Figure 11:
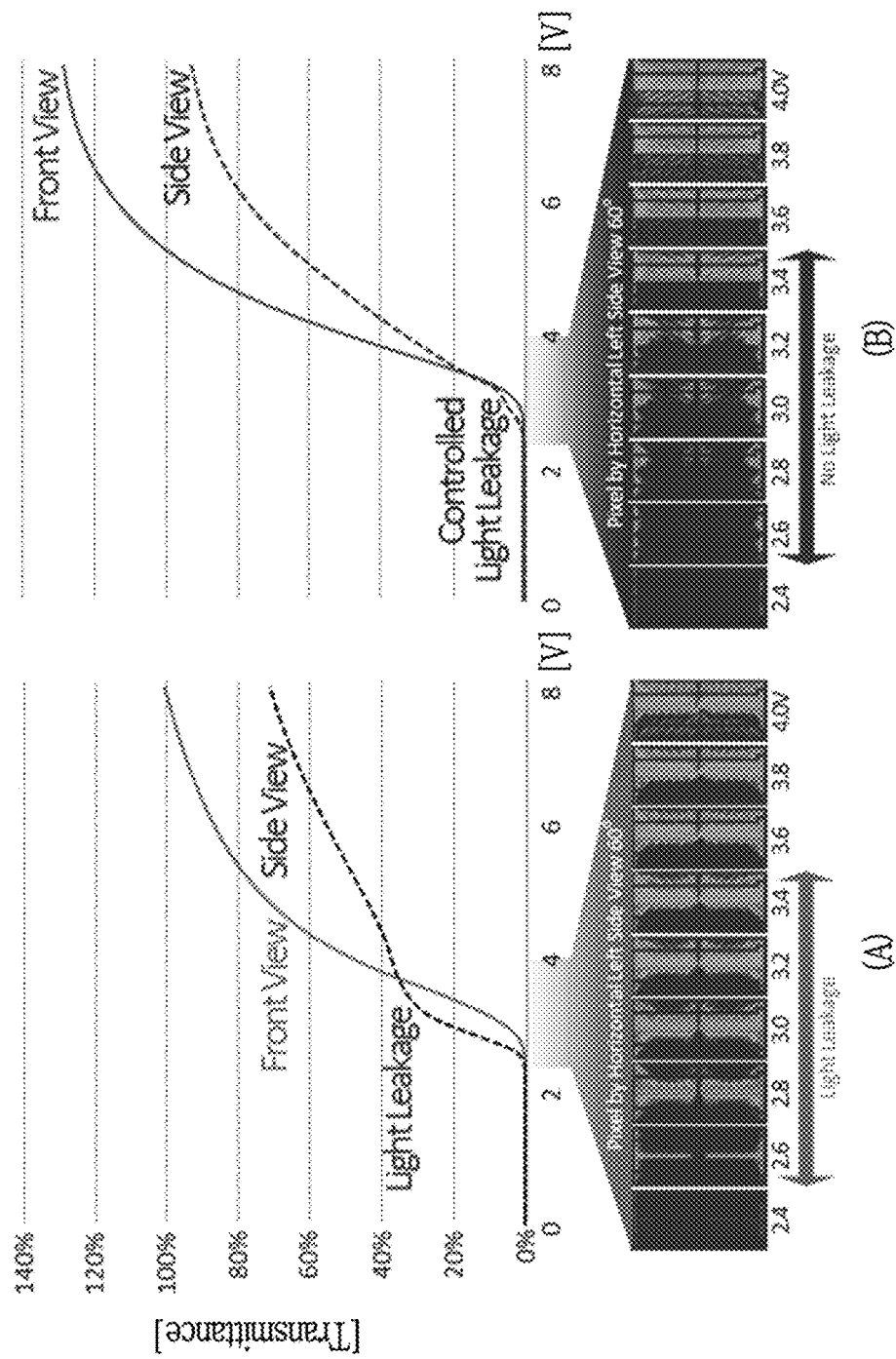
FIG. 11 is a view showing a luminance change in a front and a side according to a comparative example and an exemplary embodiment.

FIG. 11 is a view showing a luminance change in a front and a side according to a comparative example and an exemplary embodiment.

The front means the front of the liquid crystal panel, and the case that a viewing angle moves from the front to the long side direction of the liquid crystal panel means the side. Also, FIG. 11 (A) shows the comparative example, and FIG. 11 (B) shows an exemplary embodiment. In the graph of FIG. 11, the horizontal axis represents the voltage, and the vertical axis represents the transmittance at the position of 60 degrees of the side. The 100% transmittance is based on the maximum transmittance at the front of the comparative example.

As shown in FIG. 11 (A), in the case of the comparative example, a region where the front transmittance is less than the side transmittance exists where the voltage is from about 2.4 volts (V) to about 4 V. In FIG. 11, photographs showing the characteristic of the side according to the voltage of this part is added. As shown by the photographs, the light leakage phenomenon occurs at the side in the comparative example such that higher transmittance than the front transmittance appears. Also, it may be shown that the position where the light is leaked is the middle part.

As shown in FIG. 11 (B), in an exemplary embodiment, it may be shown that light is not leaked from the side even at a low gray, and thus low transmittance is maintained. As a result, in an exemplary embodiment, gray reversion may not occur on the side.

Conventionally, when the gray reversion occurs on the side as in the comparative example, a method of dividing one pixel electrode into a sub-pixel electrode for displaying a high gray and another sub-pixel electrode for displaying a low gray to be recognized with an average of the high and low grays on the side to removing side gray reversion is typically used. When one pixel includes two sub-pixel electrodes as described above, at least two thin film transistors are provided for the one pixel such that the structure of the pixel may become complicated. Also, when a pixel is formed in a small area to realize high resolution, such a structure may not be effectively formed in such a small area for the pixel.

In an exemplary embodiment, since the gray reversion does not occur on the side, one pixel may have a structure including only a single pixel electrode and a single thin film transistor, such that the pixel structure may be effectively formed in a small area to realize high resolution.

In such an embodiment, as shown in FIG. 11, when a high gray may be displayed with high transmittance, such that the image of the high luminance may also be effectively displayed on the side.

Next, the angle ϕ of the liquid crystal molecule on the side at a predetermined voltage will be described with reference to FIG. 12.

Figure 12:
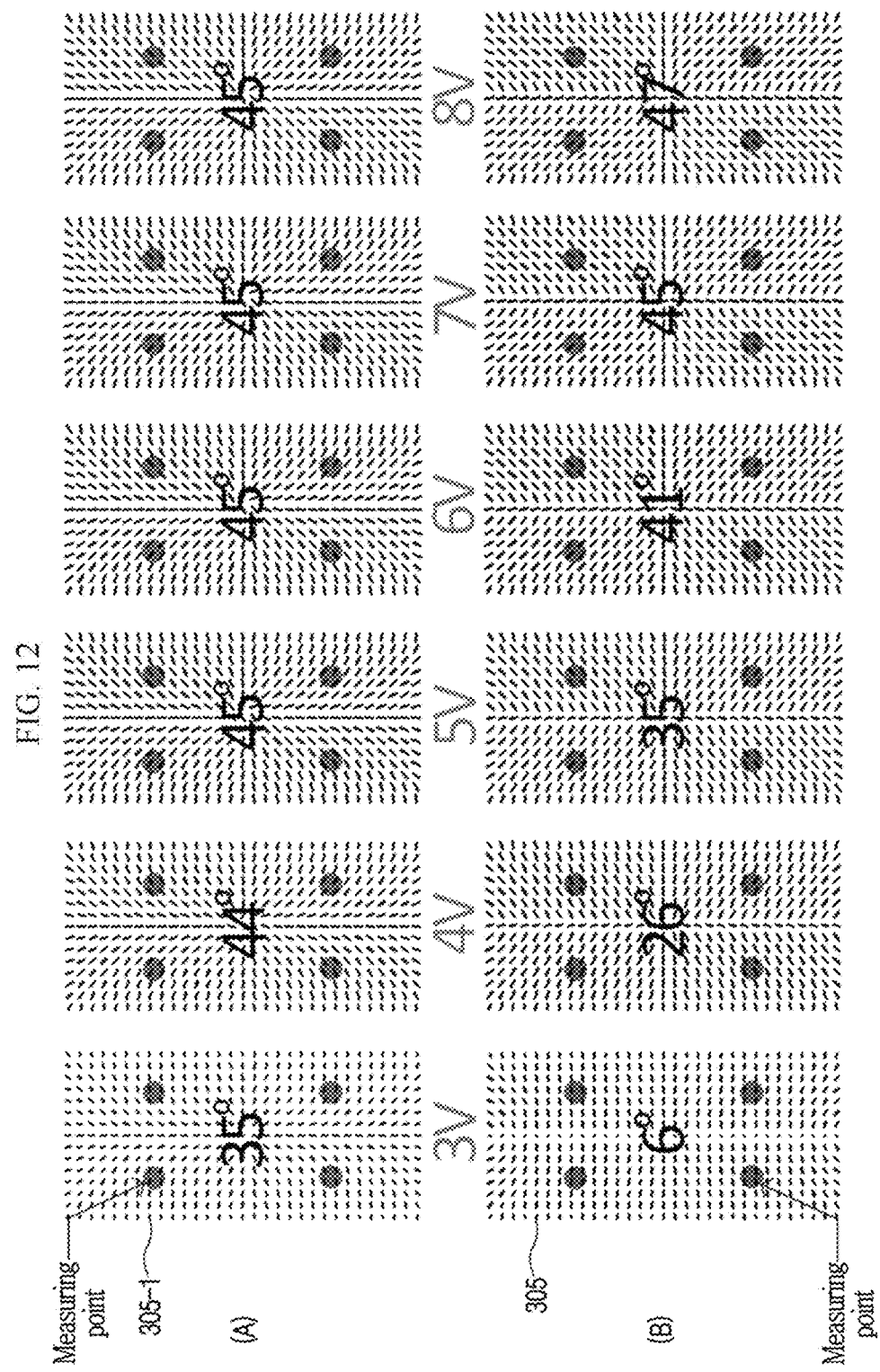
FIG. 12 is a view showing an arrangement characteristic of a liquid crystal molecule depending on a voltage at a specific position in a comparative example and an exemplary embodiment.

FIG. 12 is a view showing an arrangement characteristic of a liquid crystal molecule depending on a voltage at a specific position in a comparative example and an exemplary embodiment.

FIG. 12 (A) shows the comparative example, and FIG. 12 (B) shows an exemplary embodiment. In FIG. 12, the angle ϕ of the liquid crystal molecule at a part indicated by the circle is shown in each view. In the comparative example of FIG. 12 (A), for example, when a voltage of 3 V is applied to the pixel electrode, the angle ϕ of the liquid crystal molecule at the part indicated by the circle is 35°.

Referring to FIG. 12 (A), it is shown that the liquid crystal molecule 305-1 has a substantially constant angle φ regardless of the voltage. Considering that the maximum transmittance appears when the liquid crystal molecule 305-1 is 45°, in the corresponding part, a problem that the transmittance does not change according to the gray occurs because the maximum transmittance appears at most of the voltages.

In an exemplary embodiment, as shown in FIG. 12 (B), the angle ϕ of the liquid crystal molecule 305 is increased according to the applied voltage. In such an embodiment, it the gray representation is effectively realized on the side.

The angle ϕ of the liquid crystal molecule based on the predetermined position of the pixel electrode has been described with reference to FIG. 12. Next, the angle ϕ of the liquid crystal molecule based on three positions that are different from each other in one domain of the pixel electrode will be described with reference to FIG. 13.

Figure 13:
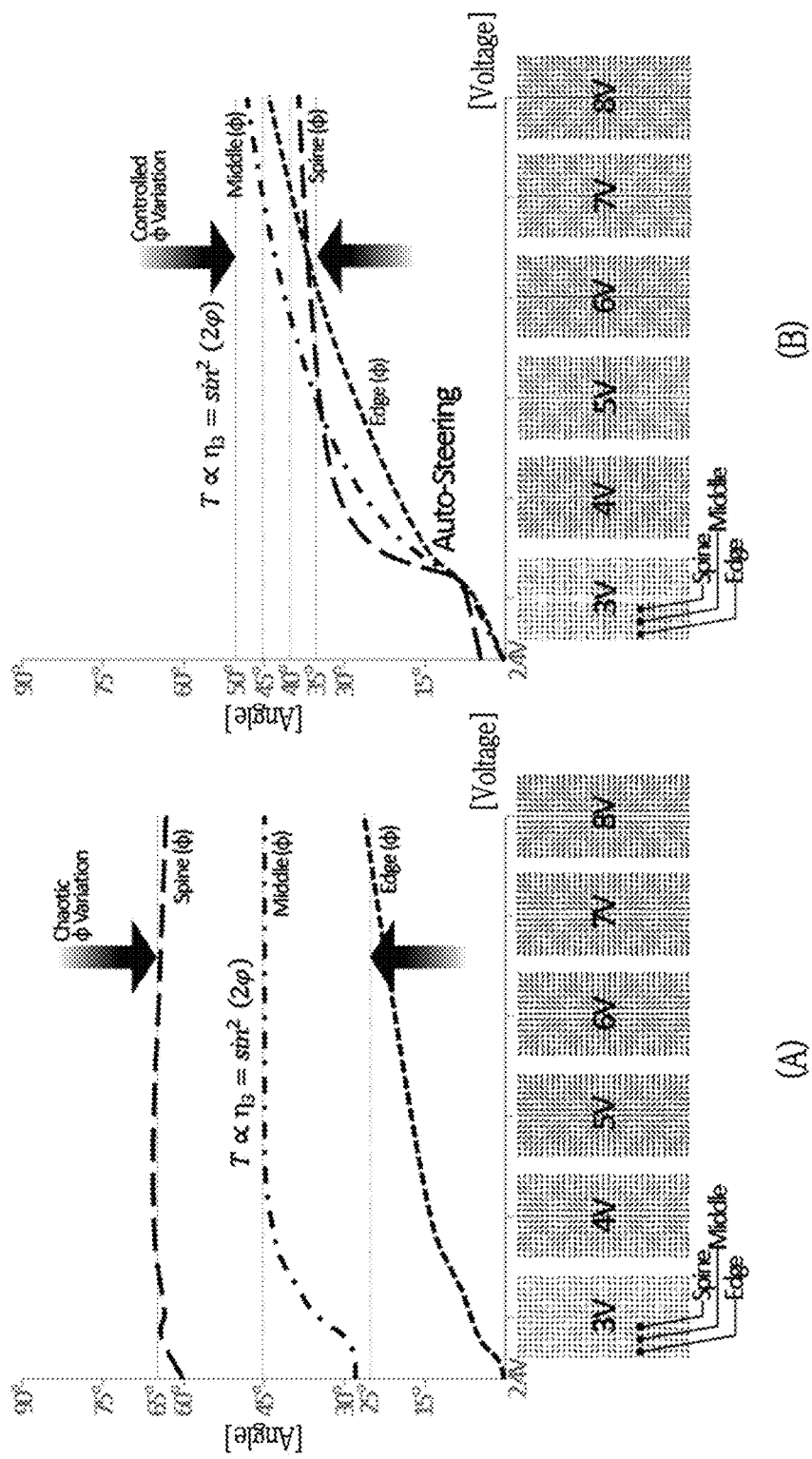
FIG. 13 is a view showing an angle depending on a position of a liquid crystal molecule depending on a voltage in a comparative example and an exemplary embodiment.

FIG. 13 is a view showing an angle at various positions of a liquid crystal molecule depending on a voltage in a comparative example and an exemplary embodiment.

FIG. 13 (A) shows the comparative example, and FIG. 13 (B) shows the exemplary embodiment.

As shown in the arrangement view of the liquid crystal molecule for 3 V at a bottom of FIG. 13 (A) and FIG. 13 (B), the angle ϕ of the liquid crystal molecule depending on each voltage is shown on three parts (an edge, a middle, a spine) in one domain.

In the comparative example, as shown in FIG. 13 (A), the angle ϕ of the liquid crystal molecule on the edge, the angle ϕ of the liquid crystal molecule on the middle, and the angle ϕ of the liquid crystal molecule on the spine adjacent to the longitudinal electrode 191 are substantially different from each other for each voltage.

In an exemplary embodiment, as shown in FIG. 13 (B), the difference of the angles ϕ of the liquid crystal molecule on the edge, the middle and the spine is substantially reduced.

As shown in FIG. 13, since the transmittance T is proportional to a square of a value obtained by applying twice the angle φ of the liquid crystal molecule in a sine function, the stain may be recognized at a specific part in the comparative example due to substantial difference in transmittance depending on positions thereof. In the comparative example, when the voltage has a predetermined value or greater, the transmittance at the spine or the middle may be limited.

In an exemplary embodiment, the angle ϕ of the liquid crystal molecule is changed depending on the change of the voltage on the edge, the middle and the spine, thereby changing the transmittance such that a grayscale may be effectively expressed. In such an embodiment, the angles ϕ of the liquid crystal molecule are similar to each other on the edge, the middle and the spine at a same voltage such that a stain, which occurs when the luminances of parts are different from each other, may be effectively prevented.

In an exemplary embodiment, the angle ϕ of the liquid crystal molecule is also small when displaying the low gray by providing the low voltage, and the angle ϕ of the liquid crystal molecule is large when displaying the high gray by the high voltage. In such an embodiment, the angle ϕ of the liquid crystal molecule is automatically adjusted depending on the voltage or the gray, as indicated by "Auto-Steering" in FIG. 13 (B). However, in the comparative example, the change of the angle ϕ of the liquid crystal molecule depending on the voltage is not substantially large such that "Auto-Steering" may not occur.

The structure of an exemplary embodiment of the pixel electrode and the common electrode has been described with reference to FIG. 3 and FIG. 7.

Next, various exemplary embodiments of the pixel electrode and the common electrode will be described with reference to FIG. 14.

Figure 14:
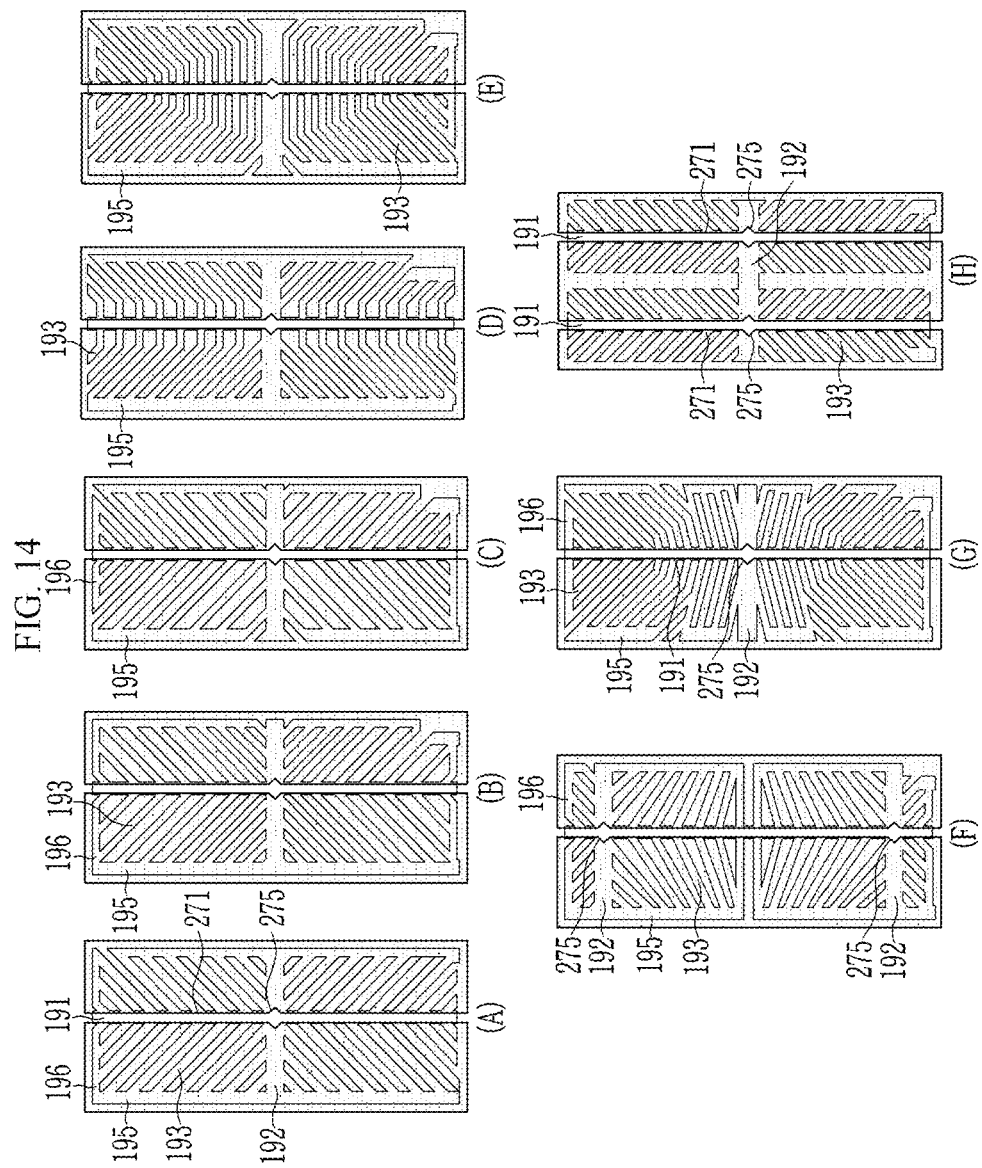
FIG. 14 is a view showing a structure of a pixel electrode and a common electrode according to various exemplary embodiments.

FIG. 14 is a view showing a structure of a pixel electrode and a common electrode according to various exemplary embodiments.

In FIG. 14, the structures of various embodiments of the pixel electrode 190 are shown. In such embodiments, the pixel electrode 190 includes the longitudinal electrode 191, the transverse electrode 192 and the branch electrode 193, and the edge transverse electrode 196 or the edge longitudinal electrode 195 are additionally provided. The branch electrode 193 may include a part that is not oblique, and in an exemplary embodiment, the number of the transverse electrodes 192 or longitudinal electrodes 191 may be two. In such embodiments, as shown in FIG. 14, the structure of the common electrode 270 includes both the longitudinal opening 271 and the notch opening 275.

First, an exemplary embodiment of FIG. 14 (A) will be described.

The pixel electrode 190 of FIG. 14 (A) includes one longitudinal electrode 191 and one transverse electrode 192, and a plurality of branch electrodes 193 extending in an oblique direction therefrom. The edge transverse electrode 196 or the edge longitudinal electrode 195 is disposed at ends of the plurality of branch electrodes 193, thereby having a closed structure in which the ends of the branch electrodes 193 are not open. In such an embodiment, the edge transverse electrode 196 is not provided at the branch electrode 193 extending in a lower direction. The edge transverse electrode 196 disposed at an upper side and the edge longitudinal electrode 195 disposed at a left side are connected to each other, however the edge longitudinal electrode 195 disposed at a right side is not connected to the edge transverse electrode 196 disposed at the upper side. In such an embodiment, the detailed connection structure may be variously modified.

The longitudinal opening 271 of the common electrode 270 is defined at a part thereof corresponding to the longitudinal electrode 191, and the notch opening 275 is defined corresponding to a part where the longitudinal electrode 191 and the transverse electrode 192 cross each other.

In an alternative exemplary embodiment, as shown in FIG. 14 (B), the edge transverse electrode 196 may be disposed below the pixel electrode 190. In such an embodiment, the edge longitudinal electrode 195 disposed at the left side is connected to the edge transverse electrode 196 disposed at the upper side.

The structure of FIG. 14 (C) is similar to that of FIG. 14 (B), except that the edge transverse electrode 196 and the edge longitudinal electrode 195 are disconnected. As shown in FIG. 14 (C), one side end of the transverse electrode 192 extends and is not connected to the edge longitudinal electrode 195 on the right side.

The structure of FIG. 14 (D) includes the edge longitudinal electrode 195, but does not include the edge transverse electrode 196. As shown in FIG. 14 (D), the branch electrode 193 includes the part that is not obliquely progressed. That is, the branch electrode 193 has a structure that extends in the horizontal direction from the longitudinal electrode 191 and is bent in the oblique direction. However, according to an alternative exemplary embodiment, the branch electrode 193 may have the structure that extends in the oblique direction from the longitudinal electrode 191 and then extends in the vertical or horizontal direction while being bent.

FIG. 14 (E) is similar to FIG. 14 (D) except that a structure thereof further includes the edge transverse electrode 196.

FIG. 14 (F) shows an exemplary embodiment including two transverse electrodes 192 in which the longitudinal electrode 191 and the transverse electrode 192 cross each other at two places such that two notch openings 275 of the common electrode 270 are defined. In the exemplary embodiment of FIG. 14 (F), the branch electrodes 193 of the pixel electrode 190 are arranged at different intervals at different angles. In such an embodiment, a gap or distance between two adjacent branch electrodes 193 is narrow at one end and wider at the other end.

FIG. 14 (G) shows an embodiment having a structure in which features of the exemplary embodiments of the invention described above are combined. In such an embodiment, the branch electrode 193 is obliquely formed at a part close to the transverse electrode 192, that is, the upper and lower part of the transverse electrode 192. In such an embodiment, the branch electrode 193 of the bent structure is disposed at both sides thereof. In such an embodiment, the uppermost and lowermost branch electrodes 193 have the structure arranged obliquely without bending again. The edge electrodes 195 and 196 for each part are disposed to have a closed structure, and the transverse electrode 192 has a structure in which an end portion is not further extended to be connected to the edge longitudinal electrode 195.

FIG. 14 (H) shows an exemplary embodiment where the pixel electrode 190 having two longitudinal electrodes 191 and one transverse electrode 192. In such an embodiment, since there two places where the transverse electrode 192 and the longitudinal electrode 191 cross each other, two notch openings 275 are defined corresponding to the crossed portions. The exemplary embodiment of FIG. 14 (H) shows a structure without the edge electrodes 195 and 196, but not being limited thereto. Alternatively, at least one among the edge electrodes 195 and 196 may be included.

The structure of the pixel electrode 190 shown in FIG. 14 merely shows some exemplary embodiments of the invention, and the invention is not limited thereto. Such embodiments may be variously modified by combining the features described above.

FIG. 14 shows a structure of the common electrode 270 in exemplary embodiments. In such embodiments, the common electrode 270 includes the longitudinal opening 271 and the notch opening 275 having a rhombus shape.

However, the structure of the common electrode 270 may also be variously modified. A structure of the common electrode 270 in exemplary embodiments will be described with reference to FIG. 15.

Figure 15:
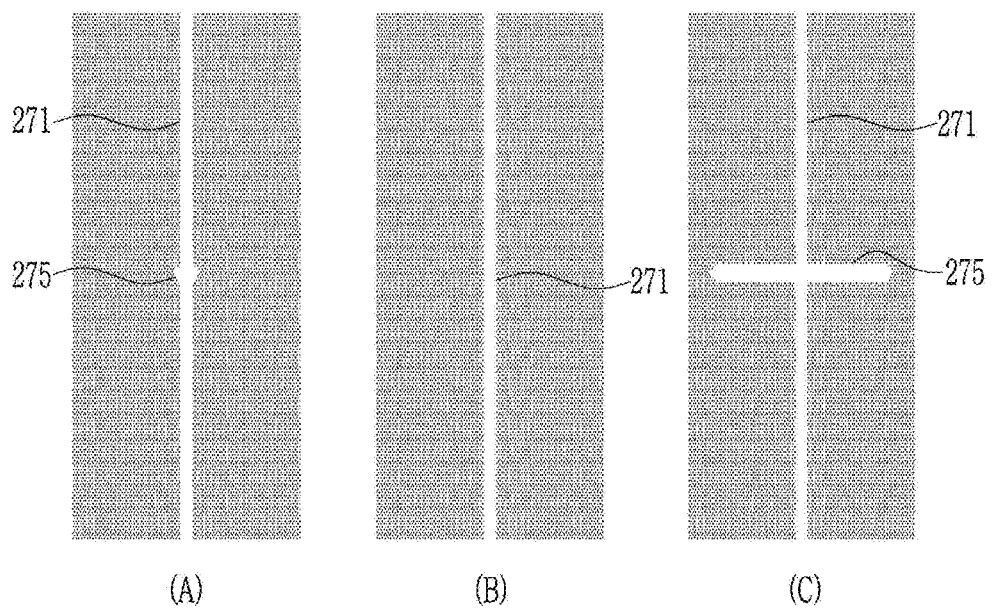
FIG. 15 is a view showing a structure of a common electrode according to various exemplary embodiments.

FIG. 15 is a view showing a structure of a common electrode according to various exemplary embodiments.

FIG. 15 (A) shows an exemplary embodiment, where the common electrode 270 has a structured described above. The notch opening 275 of FIG. 15 (A) may have one of various shapes such as a rhombus, a circle, or an octagon.

In an alternative exemplary embodiment, as shown in FIG. 15 (B), the common electrode 270 may not include the notch opening 275.

FIG. 15 (C) shows another alternative exemplary embodiment where the notch opening 275 of the common electrode 270 may have a longer elongated shape. In such an embodiment, the notch opening 275 may extend in the horizontal direction, and may be disposed at the position corresponding to the transverse electrode 192 among the pixel electrode 190. The notch opening 275 shown in FIG. 15 (C) may have a structure extending from the part where the transverse electrode 192 and the longitudinal electrode 191 cross each other and extending to a predetermined position of the transverse electrode 192.

Hereinafter, features of an exemplary embodiment having the above-described pixel structure will be described in detail.

Figure 17:
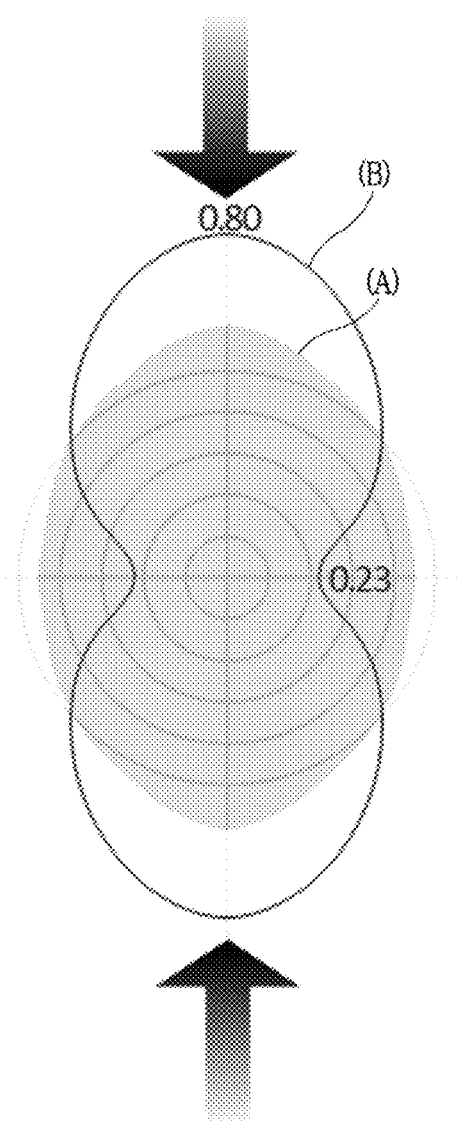
FIG. 17 is a view showing a characteristic depending on a position for an arrangement of a liquid crystal molecule according to an exemplary embodiment.

FIG. 16 is a view showing light leakage in an upper side for an arrangement of a liquid crystal molecule according to an exemplary embodiment, and FIG. 17 is a view showing a characteristic depending on a position for an arrangement of a liquid crystal molecule according to an exemplary embodiment.

As shown in FIG. 13 (B), in an exemplary embodiment, the angle φ of the liquid crystal molecule may be small when a low voltage is applied to the pixel electrode.

FIG. 16 shows the case that the angle φ of the liquid crystal molecule 305 is arranged to be small, and a case that the user views the liquid crystal molecule 305 from a side and from above.

When the angle φ of the liquid crystal molecule 305 is small, when the user views the liquid crystal molecule 305 from a side, there is no light leakage phenomenon since one end of the liquid crystal molecule 305 is seen, however, when viewed from above, the light leakage phenomenon may occur since a side of the liquid crystal molecule 305 is seen.

As shown in the graph at the bottom of FIG. 16, when the voltage of 3 V is applied, the transmittance is low when viewed from a side (a horizontal side view), such that light leakage may not occur. However, when from an upper side (a vertical side view), the transmittance is high such that light leakage may occur.

In an exemplary embodiment, the degree of transmission is measured depending on the angle of the side surface may be as shown in FIG. 17.

FIG. 17 shows a result (A) with a shape close to the circle and a result (B) with a shape similar to the shape of letter "8". Each result is a line connecting the transmittance at a certain angle. Herein, the (B) result is also referred to as an 8-shaped luminance distribution.

First, the result (A) is obtained by measuring the transmittance at various angles in the case of the comparative example, where the transmittance is relatively large at the upper side and the lower side, and the transmittance is substantially uniform.

In an exemplary embodiment, as shown by the result (B), the transmittance is low while being concave while viewing from the right and left sides, and the transmittance is very high in the upper side and lower side. When a low voltage is applied to display the low gray, the high transmittance due to the light leakage at the upper and lower side views may be undesired.

In an exemplary embodiment, as described above with reference to FIG. 2, the prism hill is oriented toward the light guide and the extending direction of the prism hill is formed in a same direction as the short side direction of the liquid crystal panel (i.e., the length direction of the pixel electrode or the extending direction of the data line).

The structure of such a prism sheet 420 has the characteristic of transmitting light to the left and right, thereby preventing light from being transmitted to up and down.

Figure 18:
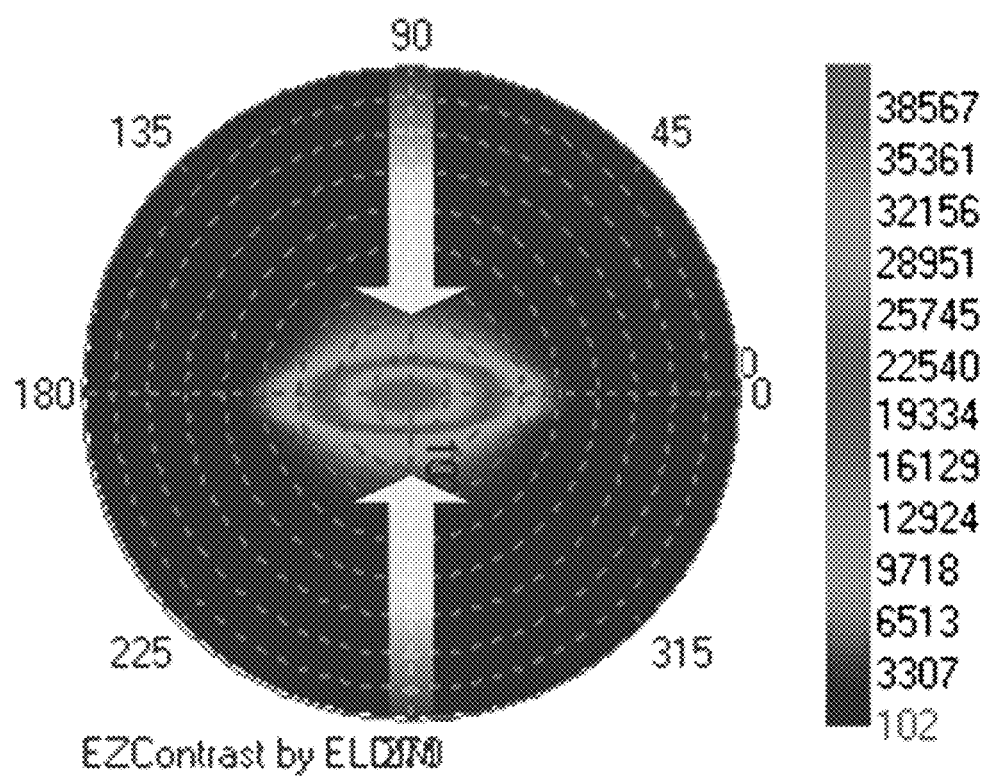
FIG. 18 is a view showing a characteristic of light provided from a backlight unit of a liquid crystal display according to an exemplary embodiment.

FIG. 18 shows the characteristic of the light passing through the backlight unit when such a prism sheet 420 is included.

FIG. 18 is a view showing a characteristic of light provided from a backlight unit of a liquid crystal display according to an exemplary embodiment.

Generally, the light provided from the backlight to the liquid crystal display represents a constant luminance of a circular shape (also referred to as a circular luminance distribution) since there is no directionality. In an exemplary embodiment, as shown in FIG. 18, the light provided from the backlight to the liquid crystal display may have relatively high luminance on the left and right sides and relatively low luminance on the upper and lower sides, thereby the luminance is displayed in an elliptical shape spread widely to the left and right (hereinafter, referred to as an elliptical luminance distribution) because the prism sheet 420 is oriented in a way such that the prism hill faces the light guide and the extending direction of the prism hill is arranged in a same direction as the length direction of the pixel electrode (i.e., the extending direction of the data line).

Hereinafter, the characteristics of light emitted from the backlight unit of the comparative example and the backlight unit of an exemplary embodiment will be described with reference to FIG. 19.

Figure 19:
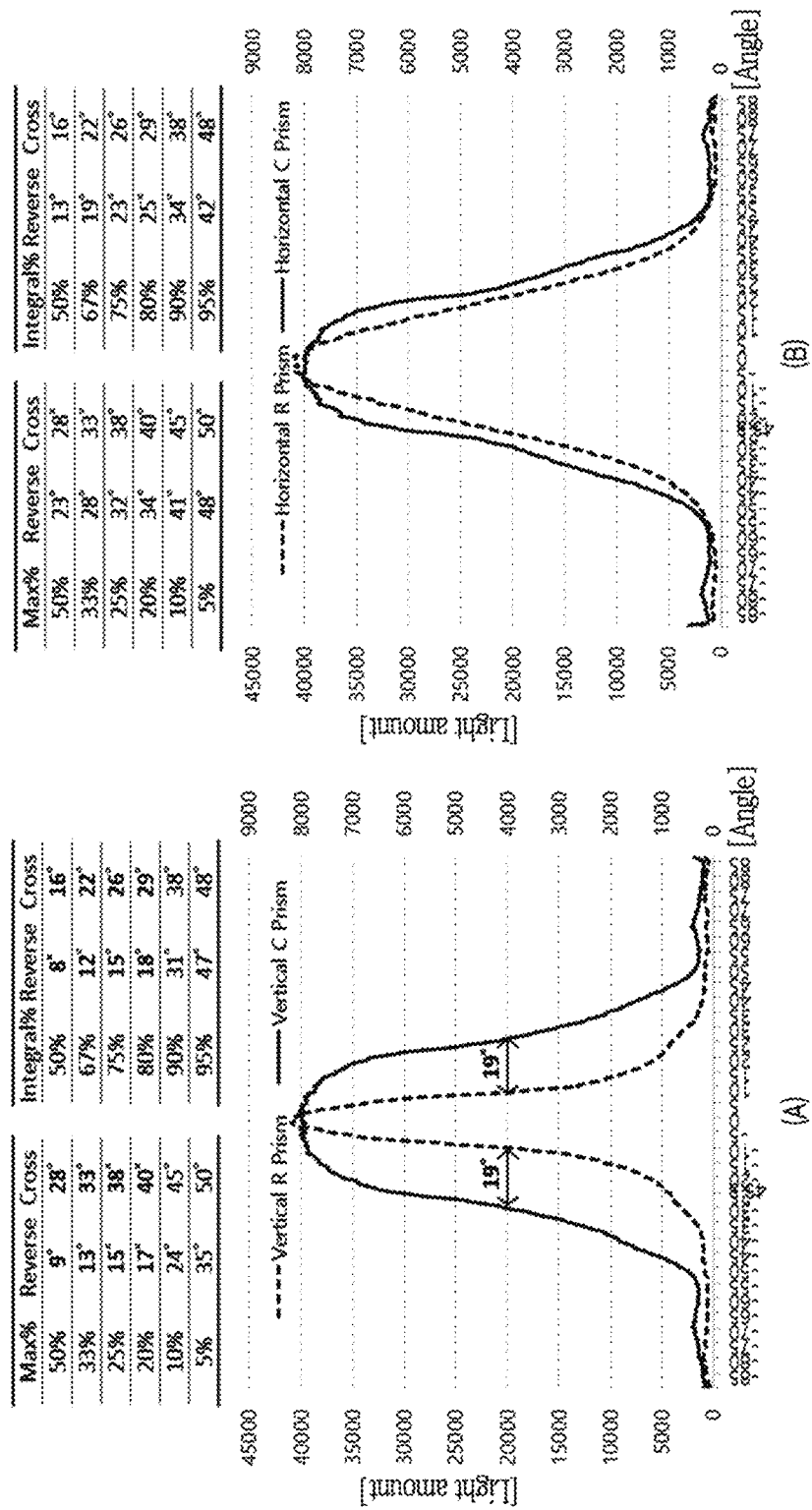
FIG. 19 is a view showing characteristic of a prism sheet according to a comparative example and characteristics of a prism sheet according to an exemplary embodiment.

FIG. 19 is a view showing characteristics of a prism sheet according to a comparative example and characteristics of a prism sheet according to an exemplary embodiment.

FIG. 19 shows the characteristics of light emitted from the backlight according to the exemplary embodiment (a reverse prism) and the comparative example (a cross prism). In the case of the comparative example, the prism hill is disposed toward the display panel, two prism sheets are used, and the extending directions of prism hills of the two prism sheets are perpendicular to each other. In such a structure, since the extending directions of the prism hill are two directions perpendicular to each other, the light spreads not only in left and right directions, but also in up and down directions. As a result, unlike FIG. 18, the light has a circular luminance distribution.

FIG. 19 (A) shows a light amount in the direction perpendicular to the extending direction of the prism hill in an exemplary embodiment (the reverse prism), that is, in the side surface. As shown in FIG. 19 (A), in an exemplary embodiment, a half width, that is, the width of the part having the light amount of 50%, is 18° (the angle of one side is 9° such that the angle of both sides is 18°). As compared with the case of the comparative example (the cross prism or C prism), the half width is small by about 19°, which is smaller by 38° as a whole.

FIG. 19 (B) shows the light amount viewed from the same direction as the extending direction of the prism hill of the exemplary embodiment (the reverse prism or R prism), that is, from the upper side or the lower side, and such light amount may be substantially the same as that of the comparative example (C prism).

This is because the characteristic has the elliptical luminance distribution due to the prism sheet 420.

The characteristic an exemplary embodiment including the prism sheet 420 and the pixel structure described above will be described in greater detail with reference to FIG. 20.

Figure 20:
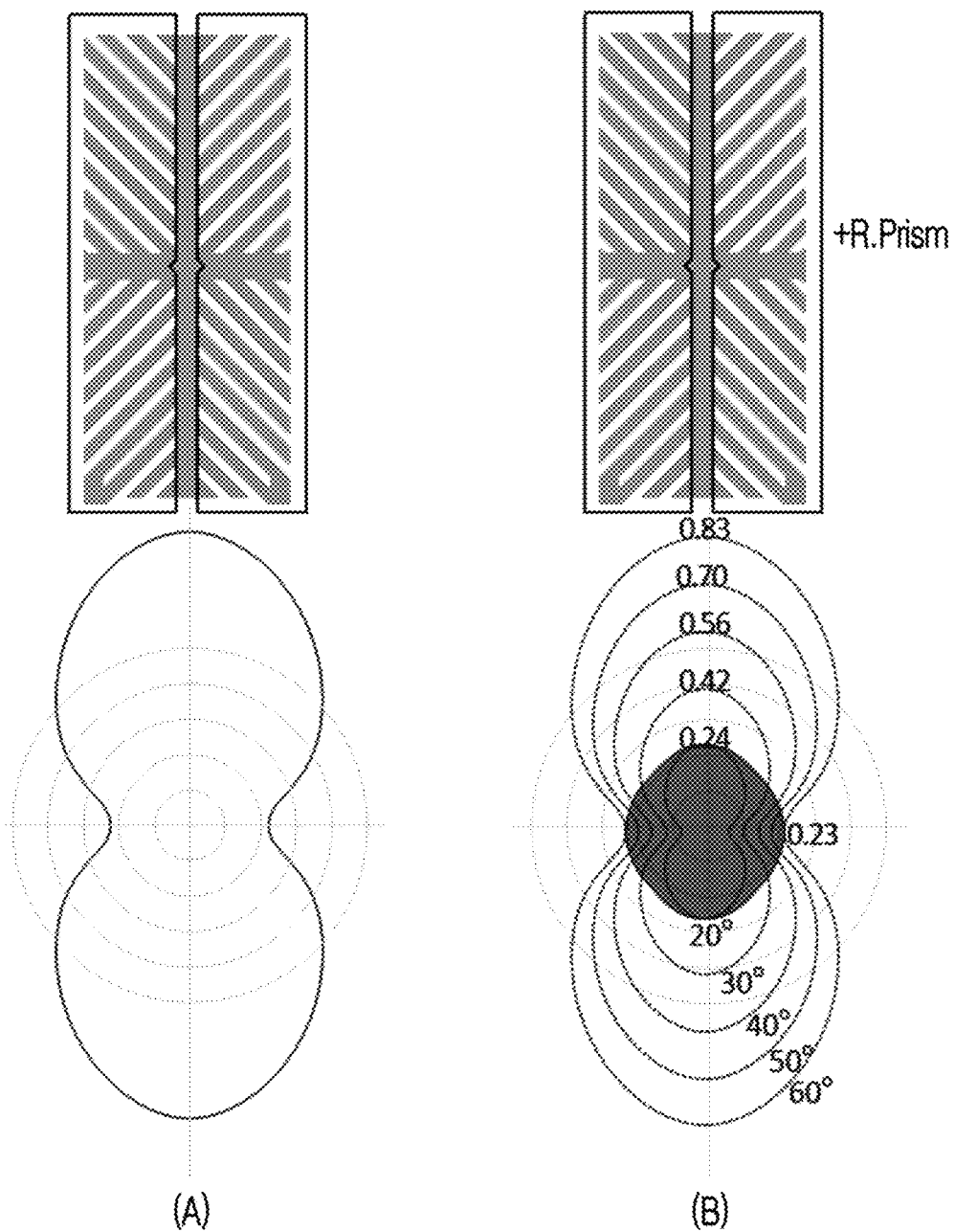
FIG. 20 is a view showing a characteristic that is changed by using a prism sheet according to an exemplary embodiment.

FIG. 20 is a view showing a characteristic that is changed by using a prism sheet according to an exemplary embodiment.

FIG. 20 (A) shows the luminance distribution of the "8" character shown in FIG. 17 as the luminance distribution depending on the angle in an exemplary embodiment.

FIG. 20 (B) shows luminance distribution compensated by the prism sheet 420 in an exemplary embodiment is shown in.

FIG. 20 (B) shows a near-circular luminance distribution at the center, which corresponds to a combination of the luminance distribution by the prism sheet 420 and the luminance distribution of FIG. 20 (A). That is, the prism sheet 420 has the luminance that is concave in the side, in which light is provided laterally by the prism sheet 420, such that a higher luminance appears. On the other hand, in FIG. 20 (A), the high luminance due to the light leakage of the upper and lower sides is reduced because less light is provided to the upper and lower sides by the prism sheet 420, thereby displaying a relatively lower luminance.

In an exemplary embodiment, as described above, the prism sheet 420 is oriented in a way such that the prism hill faces the light guide and the extending direction of the prism hill is the same as the length direction of the pixel electrode (i.e., the extending direction of the data line), and, the compensation thereby occurs in the pixel having the pattern of the pixel electrode and the pattern of the common electrode described above.

Next, the luminance distribution of the light depending on each position of the display device will be described with reference to FIG. 21. Particularly, the change of the luminance distribution of the light by the diffusion layer 330 will be described in detail.

Figure 21:
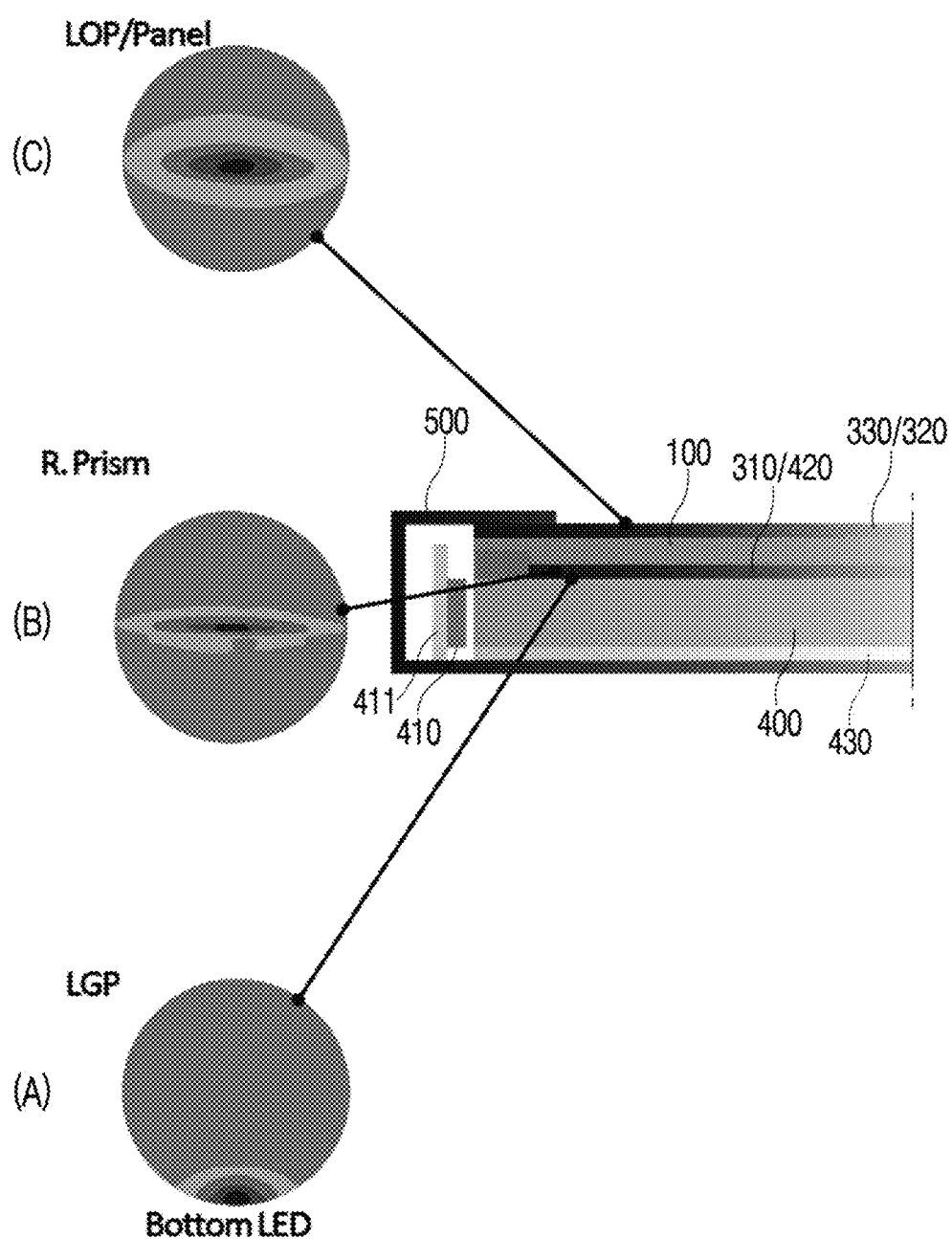
FIG. 21 is a view showing a characteristic of light per each position of a liquid crystal display according to an exemplary embodiment.

FIG. 21 is a view showing a characteristic of light at each position of a liquid crystal display according to an exemplary embodiment.

FIG. 21 schematically shows the liquid crystal display shown in FIG. 2. FIG. 21 further shows that the light source 410 is supported behind the light guide 400, and a light source substrate 411 for supplying a power to the light source 410 is additionally shown. FIG. 21 further shows that the liquid crystal display may further include a case 500 such as a chassis to receive the display panel and the backlight unit together.

FIG. 21 respectively shows the luminance distribution passing through the light guide LGP 400, the luminance distribution passing through the prism sheet 420, and the luminance distribution of the light emitted from the liquid crystal display (LOP/Panel).

First, the light incident on the prism sheet 420 after passing through the light guide 400 is shown in FIG. 21 (A).

The light from the light guide 400 is incident on the prism sheet 420 with the similar luminance distribution to the circular shape.

The luminance distribution of the light emitted after being incident to the prism sheet 420 (e.g., R. Prism) is shown in FIG. 21 (B). As shown in FIG. 21 (B), the light spreads to the left and right by the prism sheet 420 and does not spread vertically, thereby having an elliptical luminance distribution in the side.

The light emitted from the prism sheet 420 is recognized by the user through the lower polarizer 310, the display panel 100, the upper polarizer 320 and the diffusion layer 330. The luminance distribution of the light emitted through the diffusion layer 330 is shown in FIG. 21 (C).

In the luminance distribution of FIG. 21 (C), the luminance increases at the upper side and the lower side compared with the luminance distribution of FIG. 21 (B). This is because the diffusion layer 330 in the exemplary embodiment may have a characteristic of diffusing the light in the up and down directions. In such an embodiment, the prism sheet 420 transmits the light in the right and left directions such that the light is decreased in the up and down directions. However, in such an embodiment, the light in the up and down directions is compensated and displayed since the diffusion layer 330 is diffused in the up and down directions.

FIG. 21 shows an exemplary embodiment in which the light source 410 is disposed at one side of the light guide, but not being limited thereto. Alternatively, the light source 410 may be disposed under the display panel (a directly below structure). When the light source 410 has the directly below light source, a hole may be defined in the reflection sheet 430 and the light source may be disposed in the hole. In such an embodiment, a lens may be additionally provided on the light source. In such an embodiment having the directly below structure, the characteristic of the light provided to the prism sheet 420 does not change significantly, and the luminance distribution shown in FIG. 21 may be applied.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a liquid crystal panel including a liquid crystal layer, a pixel electrode, and a common electrode; and
    a backlight unit including a light source, wherein the backlight unit provides light to the liquid crystal panel,
    wherein the pixel electrode includes:
    a longitudinal electrode having a bar shape and extending in a vertical direction;
    a transverse electrode having a bar shape, crossing the longitudinal electrode, and extending in a horizontal direction; and
    a branch electrode having a bar shape, extending from the longitudinal electrode or the transverse electrode, and including an oblique part extending in an oblique direction with respect to the longitudinal electrode or the transverse electrode,
    wherein the common electrode has a longitudinal opening overlapping the longitudinal electrode of the pixel electrode, and extending in the vertical direction,
    a width of a part of the pixel electrode where the longitudinal electrode and the transverse electrode cross each other is substantially the same as a width of the transverse electrode or a width of the longitudinal electrode, and the longitudinal opening of the common electrode defines only two separable portions of the common electrode corresponding to the pixel electrode.

2. The liquid crystal display of claim 1, wherein
the pixel electrode further includes an edge transverse electrode having a bar shape, extending in the horizontal direction, and connected to an end of the longitudinal electrode.

3. The liquid crystal display of claim 2, wherein
the edge transverse electrode is connected to an end of the branch electrode.

4. The liquid crystal display of claim 3, wherein
the oblique part of the branch electrode forms an angle in a range of about 60 degrees to about 80 degrees with the transverse electrode.

5. The liquid crystal display of claim 4, wherein
the common electrode further comprises a notch opening having a width extended at the longitudinal opening.

6. The liquid crystal display of claim 5, wherein
the notch opening overlaps the part where the longitudinal electrode and the transverse electrode cross each other.

7. The liquid crystal display of claim 1, wherein
the pixel electrode further includes an edge longitudinal electrode having a bar shape, connected to an end of the transverse electrode, and parallel to the longitudinal electrode.

8. The liquid crystal display of claim 1, wherein
the pixel electrode further includes an edge longitudinal electrode having a bar shape and parallel to the longitudinal electrode, and
the edge longitudinal electrode is connected to an end of the branch electrode and is not connected to the transverse electrode.

9. The liquid crystal display of claim 1, wherein
the branch electrode further includes a part parallel to the transverse electrode or the longitudinal electrode, thereby defining a bent structure with the oblique part.

10. The liquid crystal display of claim 1, wherein
the common electrode further comprises a notch opening having a width extended at the longitudinal opening is defined in the common electrode, and
the notch opening overlaps the part where the longitudinal electrode and the transverse electrode cross each other.

11. The liquid crystal display of claim 10, wherein
the notch opening extends to be parallel to the transverse electrode.

12. The liquid crystal display of claim 1, wherein
the pixel electrode includes a first pixel electrode and a second pixel electrode adjacent to each other,
the liquid crystal panel further includes a first gate line, a second gate line, a first data line, a second data line, a first thin film transistor, and a second thin film transistor,
the first thin film transistor is connected to the first pixel electrode and connected to the first gate line and the first data line, and
the second thin film transistor is connected to the second pixel electrode and connected to the second gate line and the second data line.

13. The liquid crystal display of claim 12, wherein
the first gate line and the second gate line receive a same gate signal as each other.

14. The liquid crystal display of claim 13, wherein
the first pixel electrode and the second pixel electrode are arranged along an extending direction of the first data line and the second data line, and
the first data line and the second data line are disposed to cross the first pixel electrode and the second pixel electrode, respectively.

15. The liquid crystal display of claim 1, wherein
the liquid crystal panel further includes an upper polarizer and a lower polarizer attached at both sides thereof, respectively.

16. The liquid crystal display of claim 15, wherein
the backlight unit further includes a prism sheet disposed under the liquid crystal panel and a reflection sheet disposed under the prism sheet, and
the prism sheet has a prism hill, and the prism hill is disposed toward the reflection sheet.

17. The liquid crystal display of claim 16, wherein
an extending direction of the prism hill is the same as a short side direction of the liquid crystal panel, and
a prism hill extending in a long side direction of the liquid crystal panel is not included.

18. The liquid crystal display of claim 17, wherein
the backlight unit further includes a light guide between the prism sheet and the reflection sheet, and
the light source is disposed at a side of the light guide.

19. The liquid crystal display of claim 17, wherein
the liquid crystal panel further includes a diffuser attached to an upper surface of the upper polarizer.

20. The liquid crystal display of claim 19, wherein
the diffuser diffuses the light incident thereto to the short side direction of the liquid crystal panel.

* * * * *